United States Patent [19]

Izubayashi et al.

[11] Patent Number: 5,284,900
[45] Date of Patent: Feb. 8, 1994

[54] AQUEOUS CROSSLINKABLE RESIN DISPERSIONS, METHOD OF THEIR PRODUCTION AND USE THEREOF

[75] Inventors: Masuji Izubayashi, Nishinomiya; Masatoshi Yoshida, Osaka; Toshiaki Matsunaga, Suita; Kohei Hori, Takarazuka; Teruo Kikuta, Nagaokakyo; Shiro Nakano, Nichinan; Hidetoshi Hatta, Yonago, all of Japan

[73] Assignees: Nippon Shokubai Co., Ltd., Osaka; Oji Paper Co., Ltd., Tokyo, both of Japan

[21] Appl. No.: 708,368

[22] Filed: May 31, 1991

Related U.S. Application Data

[62] Division of Ser. No. 257,746, Oct. 14, 1988, Pat. No. 5,087,603.

[30] Foreign Application Priority Data

| Dec. 14, 1987 | [JP] | Japan | 62-314069 |
| Dec. 14, 1987 | [JP] | Japan | 62-314071 |
| Jan. 12, 1988 | [JP] | Japan | 63-3089 |
| Feb. 9, 1988 | [JP] | Japan | 63-26674 |
| Feb. 9, 1988 | [JP] | Japan | 63-26675 |
| Feb. 29, 1988 | [JP] | Japan | 63-44337 |
| Apr. 25, 1988 | [JP] | Japan | 63-103396 |
| May 16, 1988 | [JP] | Japan | 63-117065 |

[51] Int. Cl.$^5$ .............................................. C08K 3/34
[52] U.S. Cl. ............................ 524/492; 524/430; 524/459; 524/460; 524/457; 524/503
[58] Field of Search ............ 524/430, 459, 460, 492, 524/503, 457

[56] References Cited

U.S. PATENT DOCUMENTS

| 4,427,819 | 1/1984 | Wessling et al. | 524/458 |
| 4,431,768 | 2/1984 | Wessling et al. | 524/543 |
| 4,617,343 | 10/1986 | Walker et al. | 524/817 |
| 4,885,320 | 12/1989 | Biale | 523/201 |

FOREIGN PATENT DOCUMENTS 1146582 3/1969 United Kingdom .

OTHER PUBLICATIONS

Chemical Abstracts, vol. 88, No. 24, p. 39, Jun. 12, 1978, abstract No. 171036n, & JP-A-78 10 683, Jan. 31, 1978, Y. Sasaki, "Oligomeric Copolymer Emulsifying Agents for Emulsion Polymerization of Vinyl Compounds".

Primary Examiner—Joseph L. Schofer
Assistant Examiner—J. M. Reddick
Attorney, Agent, or Firm—Oblon, Spivak, McClelland, Maier & Neustadt

[57] ABSTRACT

The present invention yields a coating film excellent in adhesion, water resistance, solvent resistance and durability. A compound having a carboxyl group and a long-chain alkylthio group or a salt thereof is used as an emulsifier and emulsion polymerization is carried out using a polymerizable monomer or monomers having, within their molecule, a group reactive with a carboxyl group as raw materials for emulsion polymerization, whereby the resin produced by emulsion polymerization and the emulsifier react with each other efficiently on the occasion of film formation and form a crosslinked structure. When a compound having a polymerizable unsaturated group in addition to the carboxyl group and long-chain alkylthio group or a salt thereof is used as the emulsifier, not only the above-mentioned crosslinked structure is formed but also the polymerizable unsaturated group in the emulsifier will react with the unsaturated group in the polymerizable monomer or monomers in the manner of grafting. As a result, the compatibility between the emulsifier and the emulsion-polymerized resin is improved.

45 Claims, No Drawings

AQUEOUS CROSSLINKABLE RESIN DISPERSIONS, METHOD OF THEIR PRODUCTION AND USE THEREOF

This is a division of application Ser. No. 07/257,746, filed on Oct. 14, 1988, U.S. Pat. No. 5,087,603.

BACKGROUND OF THE INVENTION

This invention relates to aqueous resin dispersions in which the resin produced by emulsion polymerization can for crosslinks together with the emulsifier used, to a method of producing the same and to an application thereof.

Hithertofore, aqueous dispersions of vinyl polymers, such as acrylic, vinyl acetate, styrene-butadiene and like polymers, have been widely used in various industrial fields as coating compositions or binders, for instance. These dispersions are advantageous in that since they are aqueous, the toxicity and fire hazards due to organic solvents are little with said dispersions. Accordingly, the sphere of their application is expanding more and more. On the other hand, with the expansion of their fields of use, they are more and more required to have diversified and higher-level performance characteristics. The prior art aqueous dispersions cannot fully meet such current requirements any longer and therefore their range of application is limited.

To cope with these circumstances, studies are under way to improve the performance characteristics of emulsions. Various means have been proposed for improving the performance characteristics of emulsions. As one of them, there may be mentioned the method which comprises converting films obtained from an emulsion to three-dimensional crosslinked ones. For instance, Shikaze has proposed [Japanese Kokai Tokkyo Koho (Published Unexamined Patent Application) No. 52-72731] a coating composition crosslinkable at low temperatures which contains, as a coat film-forming component, a copolymer produced by emulsion copolymerizing (A) at least one water-soluble monomer having one or more carboxyl groups, (B) at least one oil-soluble monomer having two or more vinyl or allyl groups, (C) N-methylolacrylamide and (D) at least one monomer copolymerizable with these monomers.

This composition indeed forms a crosslinked coat film and has good solvent resistance but is unsatisfactory in water resistance because of the use, as the emulsifier for emulsion polymerization, of a low-molecular-weight emulsifier which is in general use. Another disadvantage is that toxic formalin is generated on the occasion of crosslinking.

In Japanese Kokai Tokkyo Koho No. 62-25163, an aqueous copolymer dispersion composition is proposed, which is prepared by adding a macromolecular hydrazine derivative which has at least two carbazoyl groups per molecule and is sparingly soluble in water to an aqueous dispersion of an aldehyde or ketone group-containing copolymer.

This composition can be crosslinked at low temperatures and gives partly improved performance characteristics. However, the emulsifier for emulsion polymerization as used there is a general-purpose low-molecular-weight and therefore said composition still has the problem of foaming due to the emulsifier as well as the drawback of unsatisfactory water resistance.

Japanese Kokai Tokkyo Koho No. 60-37801 proposes a method of improving the emulsion performance, namely:

A method of producing an aqueous vinyl resin dispersion for coating purposes which comprises polymerizing an ethylenically unsaturated monomer in an aqueous medium in the presence of a vinyl copolymer containing, within its molecule, 5–40% by weight of a unit of the formula

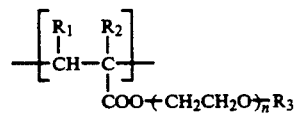

wherein $R_1$, $R_2$ and $R_3$ each independently is hydrogen or alkyl and n is 2 to 20, and having an acid value of 30–200 mg KOH/g, said vinyl copolymer being in the neutralized state.

Japanese Patent Publication No. 60-42249 proposes the following:

A method of producing an aqueous polymer dispersion which comprises radical copolymerizing 0.1–10% by weight of one or more $\alpha,\beta$-ethylenically unsaturated monomers having a sulfo substituent and 90–99.9% by weight of one or more other $\alpha,\beta$-ethylenically unsaturated monomer in an aqueous medium in the presence of a water-soluble or alkali-soluble oligomer derived from an $\alpha,\beta$-ethylenically unsaturated monomer and having a terminal alkylthio group and a molecular weight of 200–5,000.

Furthermore, Japanese Kokai Tokkyo Koho No. 61-111136, Japanese Kokai Tokkyo Koho No. 61-130376, Japanese Kokai Tokkyo Koho No. 61-7368, Japanese Kokai Tokkyo Koho No. 61-136560 and Japanese Kokai Tokkyo Koho No. 61-133137 propose the following:

A method of producing an emulsion which comprises emulsion copolymerizing a monomer or monomers using as the emulsifier an oligomer or oligomers of the general formula (1) and/or (2)

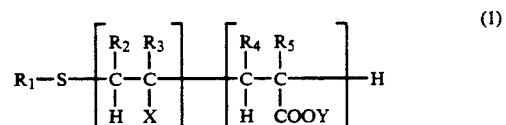

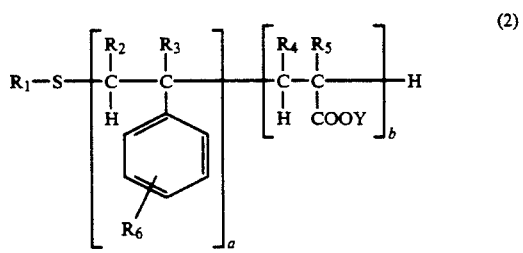

wherein $R_1$ is straight-chain primary alkyl or branched primary or secondary alkyl containing 6–16 carbon atoms, or a mixture of these, $R_2$ to $R_5$ each independently is hydrogen, carboxyl, carboxymethyl or alkyl of 1 to 5 carbon atoms, or ammonium base, amine base, alkali metal base or alkaline earth metal base thereof, $R_6$ is hydrogen, halogen or alkyl, X is cyano or —COOCH$_3$, Y is hydrogen, ammonium, amine base, alkali metal or alkaline earth metal, and a and b each independently is a number of 1–100; as well as an adhesive composition, an adhesive for carpet lining, and an adhesive to be applied to fibrous base materials, each containing said emulsion.

As compared with the use of a low-molecular-weight emulsifier such as sodium dodecylbenzenesulfonate or nonylphenol-ethylene oxide adduct, the use of the above-mentioned polymer emulsifier or oligomer emulsifier is advantageous, for example, in that foaming is slight and that the water resistance can be improved. However, these techniques allow the hydrophilic polymer used as the emulsifier to remain in films after film formation without reacting in any way. Accordingly, such performance characteristics as water resistance are still impaired although the extent of impairment is less as compared with those low-molecular-weight emulsifiers which are in general use.

As mentioned above, the known techniques or methods each still has a drawback or drawbacks or fails to afford satisfactory performance characteristics.

SUMMARY OF THE INVENTION

It is an object of the invention to provide an aqueous crosslinkable resin dispersion capable of self-crosslinking, after evaporation of volatile components, rapidly and even at low temperatures to give a coat film excellent in adhesion, water resistance, solvent resistance, durability and so forth, a method producing such dispersion and a use of such dispersion.

The above and other objects can be accomplished by providing an aqueous crosslinkable resin dispersion characterized by its being obtained by emulsion-polymerizing in an aqueous medium a monomer composition [I] composed of 0.1–40% by weight of at least one polymerizable monomer (a) having, within its molecule, a group reactive with a carboxyl group and 60–99.9% by weight of one or more other polymerizable monomer (b) [the sum total of the polymerizable monomers (a) and (b) being 100% by weight] in the presence of a water-soluble or water-dispersible emulsifier or emulsifiers selected optionally from one or both of the groups (P) and (Q) mentioned below:

(P) Polymers [IIa] having a terminal alkylthio group and an acid value of not less than 200 as obtained by polymerizing a polymerizable monomer composition [A] containing an unsaturated carboxylic acid as an essential component thereof in the presence of an alkylmercaptan [B] having 6 to 18 carbon atoms; and/or salts thereof;

(Q) Polymers [IIb] having a terminal alkylthio group and an acid value of not less than 200 as obtained by polymerizing a polymerizable monomer composition [A] containing an unsaturated carboxylic acid as an essential component thereof in the presence of an alkylmercaptan [B] having 6 to 18 carbon atoms and further reacting the resulting polymer with a polymerizable monomer (c) having, within its molecule, a group reactive with a carboxyl group; and/or salts thereof.

The above and other objects can also be accomplished by providing a method of producing aqueous crosslinkable resin dispersions which comprises emulsion-polymerizing in an aqueous medium a monomer composition [I] composed of 0.1–40% by weight of at least one polymerizable monomer (a) having, within its molecule, a group reactive with a carboxyl group and 60–99.9% by weight of one or more other polymerizable monomer (b) [the sum total of the polymerizable monomers (a) and (b) being 100% by weight] in the presence of a water-soluble or water-dispersible emulsifier or emulsifiers selected optionally from one or both of the groups (P) and (Q) mentioned above.

The aqueous crosslinkable resin dispersions according to the present invention and compositions derived from said dispersions by adding a metal oxide, a water-soluble resin and/or the like can be used, either as they are or after further addition of additives, such as crosslinking agents, fillers, heat-sensitive color-developing components and pressure-sensitive color-developing components, as coating compositions, textile-finishing compositions, adhesives, coating compositions for heat-sensitive color-developing layer formation, coating compositions for pressure-sensitive color-developing layer formation, and compositions to be used in other fields of application.

DETAILED DESCRIPTION OF THE INVENTION

The polymers, inclusive of salts thereof, belonging to the groups (P) and (Q), which are used as emulsifiers in accordance with the present invention and are produced by using the above-mentioned materials, should have an acid value of not less than 200 so that the emulsified system can have a sufficient degree of stability during emulsion polymerization and that the water resistance, solvent resistance, strength and other characteristics can be secured when coat films are formed from the resin produced. Said polymers preferably have a molecular weight of within the range 300–7,000, in particular within the range of 400–4,000. When the molecular weight is outside this range, the emulsion stability may become insufficient or the resin coat films obtained may be not excellent in all the respects, namely, water resistance, solvent resistance and strength.

In the following, the polymerizable monomer composition [A] containing an unsaturated carboxylic acid as an essential component thereof, the alkylmercaptan [B], and the radical polymerization initiator, which are used in the synsthesis of the polymer [IIa] or [IIb], as well as the polymerizable monomer or monomers (c) having, within their molecule, a group reactive with a carboxyl group, which is to be used in the synthesis of the polymer [IIb], are described in further detail.

The unsaturated carboxylic acid provides the polymer [IIa] or [IIb] with hydrophilic property by introducing a carboxyl group thereinto. Said carboxyl group serves as a functional group in crosslinking the resin obtained by emulsion polymerization of the monomer composition [I] by means of said polymer [IIa] and/or [IIb]. The unsaturated carboxylic acid is not limited to any particular species if it has a carboxyl group and a polymerizable unsaturated group within its molecule. As examples of such unsaturated carboxylic acid, there may be mentioned, for example, unsaturated monocarboxylic acids, such as (meth)acrylic acid and crotonic acid; unsaturated polybasic carboxylic acids, such as maleic acid, fumaric acid and itaconic acid; and monoester compounds derived from these unsaturated polybasic carboxylic acids and monohydric alcohols. These may be used either singly or as a mixture of two or more.

While the polymerizable monomer composition [A] may consist of an unsaturated carboxylic acid alone, one or more other polymerizable monomers may be used in combination as necessary. Usable polymerizable monomers are not limited to any particular species provided that they are copolymerizable with the unsaturated carboxylic acid. Thus, mention may be made of styrene and styrene derivatives, such as vinyltoluene, α-methylstyrene, chloromethylstyrene, styrenesulfonic acid and salts thereof; (meth)acrylamide and (meth)acrylamide derivatives, such as N-monomethyl(meth)acrylamide, N-monoethyl(meth)acrylamide, N-methylolacrylamide and N,N-dimethyl(meth)acrylamide; (meth)acrylic acid esters synthesized by esterification of (meth)acrylic acid with $C_1$-$C_{18}$ alcohols, such as methyl (meth)acrylate, ethyl (meth)-acrylate and butyl (meth)acrylate; hydroxyl group-containing (meth)acrylic acid esters, such as 2-hydroxyethyl (meth)acrylate, 2-hydroxypropyl (meth)acrylate and monoesters of (meth)acrylic acid and polypropylene glycol or polyethylene glycol; 2-sulfoethyl (meth)acrylate and salts thereof, vinylsulfonic acid and salts thereof, (meth)acrylonitrile, and so forth. These may be used either alone or in the form of a mixture of two or more. The polymerizable monomers other than the unsaturated carboxylic acid can modify the compatibility between the emulsifier obtained by polymerizing the polymerizable monomer or monomers [A] and the polymer component obtained by emulsion-polymerizing the monomer components in the presence of said emulsifier, the crosslinkability of said polymer component with said emulsifier, and the hydrophilic-hydrophobic balance of said emulsifier. Therefore, when one or more polymerizable monomers other than the unsaturated carboxylic acid are used, it is necessary to determine their kind and amount carefully in due consideration of the above facts. As for their amount, they should be used in an amount such that the polymer [IIa] or [IIb] can have an acid value of not less than 200. Acid values below 200 are undesirable because the performance of said polymers as emulsifiers and/or the crosslinkability of the aqueous crosslinkable resin dispersion is decreased at such acid values.

The alkylmercaptan [B] is used for the purpose of rendering the polymer [IIa] or [IIb] surface-active by introducing into it a terminal alkylthio group. Alkylmercaptans having 5 carbon atoms or 19 or more carbon atoms cannot be used since such alkylmercaptans may impair the emulsion stability during emulsion polymerization and the storage stability. The alkylmercaptan [B] should be used in an amount selected depending on the desired molecular weight of the polymer [IIa] or [IIb]. Generally, however, it is preferably used in an amount within the range of 2-300 parts by weight per 100 parts by weight of the polymerizable monomer composition [A]. As examples of such alkylmercaptan [B], there may be mentioned n-hexylmercaptan, n-octylmercaptan, n-dodecylmercaptan, t-dodecylmercaptan, cetylmercaptan and stearylmercaptan, among others. These may be used either singly or in the form of a mixture of two or more.

The radical polymerization initiator may be any of known oil-soluble and water-soluble polymerization initiators. For efficient production of polymers having a terminal alkylthio group, said initiator should preferably be used in an amount of 1 mole or less, more preferably not more than 0.1 mole, per mole of the alkylmercaptan [B].

Depending on their properties, the polymers [IIa] and [IIb] can be produced by any of the bulk polymerization, solution polymerization and suspension polymerization methods. A polymerization temperature of 50°-150° C. and a polymerization period of 1-8 hours are preferred. The solvent for solution polymerization may be any solvent provided that the polymerizable monomer composition [A], alkylmercaptan [B] and radical polymerization initiator are soluble in it and that it will not interfere with the radical polymerization.

The polymerizable monomer or monomers (c) to be used in the synthesis of the polymer [IIb] are now described in further detail. These polymerizable monomers (c) contain a group reactive with a carboxyl group and in addition a polymerizable unsaturated group. They are used for the purpose of introducing a polymerizable unsaturated group into the polymer to be used as the emulsifier. As examples of such polymerizable monomers (c), there may be mentioned epoxy groupcontaining polymerizable monomers, such as glycidyl (meth)acrylate and (meth)allyl glycidyl ether; oxazoline group-containing polymerizable monomers, such as 2-isopropenyl-2-oxazoline and 2-vinyl-2-oxazoline; aziridine group-containing polymerizable monomers, such as 2-aziridinylethyl (meth)acrylate and (meth)acryloylaziridine; and hydroxyl group-containing polymerizable monomers, such as 2-hydroxyethyl (meth)acrylate, (meth)allyl alcohol, and monomer esters between (meth)acrylic acid and polypropylene glycol or polyethylene glycol. These may be used either singly or in the form of a mixture of two or more.

In this case, the amount of the polymerizable monomers (c) should be such that they will not consume the free carboxyl group contained in the polymerizable monomer composition [A] to an excessive extent as a result of their reaction with said carboxyl group or in other words, such that the acid value of the emulsifier can be retained at a level not less than 200.

The polymers [IIb] and/or salts thereof as synthesized by using the polymerizable monomers (c) are polymerizable. When such polymers are used as the emulsifiers in emulsion-polymerizing the monomer composition [I], the copolymerization reaction of said polymers [IIb] and/or salts thereof and the monomer composition takes place in addition to the crosslinking reaction between the carboxyl group which said polymers [IIb] and/or salts thereof have and the functional group contained in said monomer composition [I] and reactive with the carboxyl group, whereby the integration is more promoted as compared with the case where the polymers [IIa] and/or salts thereof are used. Furthermore, the use of the polymers [IIb] and/or salts thereof allows the reaction of the double bond of the polymerizable monomer (a) and/or the polymerizable monomer (b) of the monomer composition [I] with the double bond of the emulsifier in the manner of grafting already in the state of aqueous disperison before film formation. As a result, the foaming of the aqueous crosslinkable resin dispersion is advantageously more decreased. Therefore, as compared with the case where the polymers [IIa] and/or salts thereof are used, the aqueous crosslinkable resin dispersions obtained with the polymers [IIb] and/or salts thereof the integration of which with the polymer formed by emulsion polymerization can be readily promoted can exhibit much improved performance characteristics in various fields of application.

The polymerizable monomers (c) are preferably used in an amount of 1-100 molecules, more preferably 1-10 molecules, per molecule of the polymer [IIb]. When the polymerizable monomer composition [A] contains a hydroxyl group-containing polymerizable monomer, the polymerizable monomer or monomers (c) should preferably contains an epoxy, oxazoline or aziridine group.

In synthesizing the polymers [IIb], the polymers [IIa] as they are reacted with the polymerizable monomers (c), if necessary after dilution with a solvent. In that case, the reaction is preferably carried out at ordinary temperature to 200° C., more preferably 50°-150° C. The polymers [IIa] and [IIb] preferably have a molecular weight 400–10,000, more preferably 400–5,000.

In accordance with the present invention, the above-mentioned polymers [IIa] and/or [IIb], and/or salts thereof (sometimes referred to also as polymer salts) are used as the emulsifiers.

The above-mentioned polymer salts can be obtained by neutralizing in advance part or the whole of the polymerizable monomer or monomers (a) to be used in the production of the polymers [IIa] with a basic compound and then performing the polymerization by the same procedure as used in producing the polymers [IIa] and/or [IIb]. Alternatively, they can be obtained by adding a basic compound to the polymers [IIa] and/or [IIb]. In this case, the basic compound is added in an amount sufficient to neutralize part or the whole of the carboxyl group in the polymers.

Although the polymers [IIa] and [IIb] are already surface-active, their use in the form of a salt resulting from partial or entire neutralization of the carboxyl group can lead to improved dispersion stability of the polymer particles formed and this makes it possible to obtain aqueous crosslinkable resin dispersions excellent in stability during emulsion polymerization and during storage. In this case, it is preferable, however, to neutralize the carboxyl group only partially, since complete neutralization of the carboxyl group may lead to decreased crosslinkability of the polymer formed by emulsion polymerization and the emulsifier.

Usable as the neutralizing agent are bases in general use, for example alkali metal compounds, such as sodium hydroxide and potassium hydroxide; alkaline earth metal compounds, such as calcium hydroxide and calcium carbonate; ammonia; and water-soluble organic amines, such as monomethylamine, dimethylamine, trimethylamine, monoethylamine, diethylamine, triethylamine, monopropylamine, dimethylpropylamine, monoethanolamine, diethanolamine, triethanolamine, ethylenediamine and diethylenetriamine. These may be used either singly or in the form of a mixture of two or more. When more improved coat film water resistance is desired, low-boiling temperature amines capable of evaporating at an ordinary temperatures or upon heating, for example ammonia, monomethylamine, dimethylamine, trimethylamine and the like, are preferably used.

The polymers [IIa] and/or salts thereof, which belong to the group (P), and the polymers [IIb] and/or salts thereof, which belong to the group (Q), as obtained by the above process can produce remarkable effects as the emulsifiers in the practice of the invention. For securing the emulsion stability during processing of the aqueous crosslinkable resin dispersions, and at the same time for making the characteristic effects of the present invention to be produced more fully, in various applications, said emulsifiers should preferably satisfy the following requirements from the structural formula viewpoint:

That they should have $R_1S-$ [$R_1$ being alkyl having 6 to 18 carbon atoms] at one end of their molecule and —H at the other and comprise repeating units of the general formulas

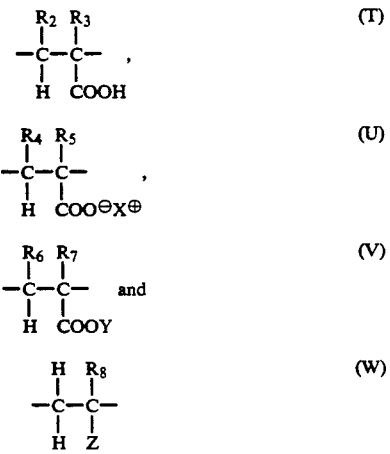

in which $R_2$ to $R_8$ are the same or different in and/or among the units T, U, V and W and each is hydrogen, halogen, methyl, carboxyl, alkoxycarbonyl or $COO^-.M^+$ [$M^+$ being ammonium cation, amine cation, alkali metal cation or half of alkaline earth metal cation], $X^+$ is always the same or may differ from one occurrence to another occurrence of the unit U and stands for ammonium cation, amine cation, alkali metal cation or half of alkaline earth metal cation, Y is a group having a polymerizable unsaturated bond, Z is nitrile (cyano), phenyl, substituted phenyl, amido (carbamoyl), N-mono- or N,N-disubstituted amido, alkoxycarbonyl or a group of the formula $COO-(-R_9-O-)_n H$ [$R_9$ being alkylene having 2 to 4 carbon atoms and n being an integer of 1 to 50], said repeating units T, U, V and W being arranged in an optional order provided that the following numerical conditions should be satisfied: that the number of occurrences of T and the number of occurrences of U are each independently 0 or 1 to 500, with a total number of occurrences of T and U of 1 to 500, that the number of occurrences of V is 0 or 1 to 100 and that the number of occurrences of W is 0 or 1 to 250.

The meaning of each symbol used above is explained hereinbelow.

First, the alkyl having 6 to 18 carbon atoms, which is represented by $R_1$ includes, among others, such straight or branched alkyls as hexyl, heptyl, octyl, nonyl, decanyl, undecanyl, dodecanyl, tetradecanyl, pentadecanyl, octadecanyl, 2,3,5-trimethylhexanyl, 2,7,8-trimethyldecanyl and 5-methyl-4-propyldecanyl.

Referring to $R_2$ to $R_8$, the halogen represented thereby includes fluorine, chlorine, bromine and iodine, the alkoxycarbonyl represented thereby includes, among others, methoxycarbonyl, ethoxycarboyl, propoxycarbonyl, isopropoxycarbonyl, butyloxycarbonyl, tertbutyloxycarbonyl, pentyloxycarbonyl, hexyloxycarbonyl, 2-ethylhexyloxycarbonyl, dodecanyloxycarbonyl and octadecanyloxycarbonyl.

Examples of the amine cation represented by $M^+$ or $X^+$ are dimethylammonium, diethanolammonium, trimethylammonium, triethylammonium, pyridinium and picolinium; examples of the alkali metal cation represented thereby are sodium ion and potassium ion; and examples of the alkaline earth metal ion are magnesium ion, calcium ion and barium ion.

Among the groups represented by Z, the substituted phenyl is, for example, tolyl, α-methylnaphthyl, β-methylnaphthyl, hydroxyphenyl, aminophenyl, nitrophenyl or cyanophenyl.

Among the groups represented by Z, the substituent for the hydrogen atom of the amido group may have includes, among others, alkyls such as methyl, ethyl, propyl, isopropyl, butyl, tert-butyl and hexyl, and hydroxyalkyls such as methylol, hydroxyethyl, hydroxypropyl, hydroxyisopropyl, and the like.

Among the groups represented by Z, the alkoxycarbonyl may include those examples given hereinabove.

As the alkylene of 2 to 4 carbon atoms as represented by $R_9$ there may be mentioned ethylene, propylene, butylene and 2-methylpropylene, among others.

The above examples are all typical examples in the practice of the present invention and it is to be noted that the scope of the present invention is by no means limited to such examples.

The total sum of occurrences of the above-mentioned T, U, V and W is preferably 2 to 150, more preferably 2 to 70, in each emulsifier molecule.

The aqueous crosslinkable resin dispersion according to the invention can be produced by emulsionpolymerizing in an aqueous medium a monomer composition [I] composed of 0.1–40% by weight of at least one polymerizable monomer (a) having, within its molecule, a group reactive with a carboxyl group and 60–99.9% by weight of one or more other polymerizable monomers (b) [the sum total of the polymerizable monomers (a) and (b) being 100% by weight] in the presence of a water-soluble or water-dispersible emulsifier or emulsifiers selected optionally from one or both of the group (P), which includes the above-mentioned polymers [IIa] and/or salts thereof, and the group (Q), which includes the polymers [IIb] and/or salts thereof.

The polymerizable monomer (a) is a compound having, within its molecule, a polymerizable double bond and in addition a group reactive with a carboxyl group, such as an epoxy, aziridine or oxazoline group. As examples of this polymerizable monomer (a), there may be mentioned those examples given above referring to the polymerizable monomers (c) which are used in synthesizing the polymerizable unsaturated group-containing polymers [IIb]. Among them, however, those polymerizable monomers which contain an epoxy, oxazoline or aziridine group are preferably used.

The polymerizable monomer (a) is used for the purpose of introducing a group reactive with a carboxyl group into the polymer formed by emulsion polymerization. By this it becomes possible for the above-mentioned polymer and the emulsifier to react with each other to form a covalent bond. Said monomer (a) is used in an amount of 0.1–40% by weight, more preferably 0.5–20% by weight, of the monomer composition [I]. If the amount of the polymerizable monomer (a) is less than 0.1% by weight, films obtained from the aqueous crosslinkable resin dispersion will have an insufficient crosslinking density, hence the desired improvements in water resistance, solvent resistance and durability will not be produced to a satisfactory extent. When, conversely, said monomer (a) is used in an amount exceeding 40% by weight, the product films will become hard and brittle. In either case, the utility of said dispersion will be decreased in various fields of application.

The other polymerizable monomer (b) is not limited to any particular species or class but may be any monomer provided that it is copolymerizable with the polymerizable monomer (a). Said monomer (b) thus includes, among others, styrene and styrene derivatives, such as vinyltoluene, α-methylstyrene, chloromethylstyrene, styrenesulfonic acid and salts thereof; (meth)acrylamide and derivatives thereof, such as N-monomethyl(meth)acrylamide, N-monoethyl(meth)acrylamide and N,N-dimethyl(meth)acrylamide; (meth)acrylic acid esters synthesized by esterification of (meth)acrylic acid with $C_1$–$C_{18}$ alcohols, such as methyl (meth)-acrylate, ethyl (meth)acrylate and butyl (meth)acrylate; 2-sulfoethyl (meth)acrylate and salts thereof, vinylsulfonic acid and salts thereof, vinyl acetate, (meth)acrylonitrile; polymerizable basic monomers, such as dimethylaminoethyl (meth)acrylate, dimethylaminoethyl(meth)acrylamide, dimethylaminopropyl(meth)acrylamide, vinylpyridine, vinylimidazole and vinylpyrrolidone; polyfunctional (meth)acrylic acid esters having two or more polymerizable unsaturated groups within their molecule, for example esters of (meth)acrylic acid with polyhydric alcohols such as ethylene glycol, 1,3-butylene glycol, diethylene glycol, 1,6-hexane glycol, neopentyl glycol, polyethylene glycol, polypropylene glycol, trimethylolpropane, pentaerythritol and dipentaerythritol; (meth)acrylamides, such as N-methylol(meth)acrylamide and N-butoxymethyl(meth)acrylamide; organic silicon-containing monomers, such as vinyltrimethoxysilane, γ-(meth)acryloyloxypropyltrimethoxysilane, allyltriethoxysilane, trimethoxysilylpropylallylamine, vinyltriethoxysilane, vinyltrimethoxyethoxysilane, (meth)acryloyloxypropyltriethoxysilane and (meth)acryloyloxypropylmethyldimethoxysilane; vinyl fluoride, vinylidene fluoride, vinyl chloride, vinylidene chloride, divinylbenzene and diallyl phthalate.

In a preferred embodiment of the invention, an organic silicon-containing monomer is used among the other polymerizable monomers (b). Organic silicon-containing monomers are compounds having, within their molecule, a polymerizable unsaturated group and a hydrolyzable group directly bound to the silicon atom and are effective in improving the adhesion to various kinds of substance, thus making it possible to provide aqueous crosslinkable resin dispersions more useful in various fields of use. The use of an organic silicon-containing monomer in an amount of 0.1–20% by weight based on the monomer composition [I] will give favorable results.

The aqueous crosslinkable resin dispersion according to the invention can be produced by any of the so-far known emulsion polymerization processes. Thus, for instance, the technique comprising subjecting to polymerization the whole mixture of a polymerization catalyst, water, the above-mentioned emulsifier, and the monomer composition [I], or the so-called monomer dropping method, pre-emulsion method, seed polymerization method or multistep polymerization method can be employed.

In a more preferred embodiment of the invention, the multistep polymerization method is used. Thus, the monomer composition [I] is divided into two or more portions differing in composition from each other [e.g. differing in the content of polymerizable monomer (a)] and multistep polymerization is carried out by feeding these portions successively, whereby the storage stability and crosslinkability of the aqueous crosslinkable linkable resin dispersion can be both improved simultaneously. According to a technique of multistep polymerization by which this effect can be produced most efficiently, a monomer portion which does not contain any polymerizable monomer (a) is subjected to polymerization in the last step.

The emulsion polymerization is carried out generally at a temperature of 0°–100° C., preferably 50°–80° C., for a period of 1–10 hours. In performing emulsion polymerization, a hydrophilic solvent, a known emulsifier and other additives may be added if, at the addition levels employed, they will not adversely affect the physical properties of the coat films.

The amount of the emulsifier or emulsifiers selected from one or both of the groups (P) and (Q) is not critical. Preferably, however, they are used in an amount of 0.5–20 parts by weight, more preferably 1–15 parts by weight, per 100 parts by weight of the polymerizable monomer mixture.

The polymerization catalyst may be any of the so-far known ones. For producing aqueous resin dispersions capable of giving coat films more excellent in water resistance, however, polymerization catalysts which will not leave the sulfate ion, such as hydrogen peroxide, di-t-butyl peroxide, peracetic acid, 2,2'-azobis(2-amidinopropane) dihydrochloride and 4,4'-azobis(4-cyanopentanoic acid), should preferably be used either singly or in the form of a mixture of two or more. In cases where at least one of the polymerizable monomers has a functional group reactive with a carboxyl group, 2,2'-azobis(2-amidinopropane) dihydrochloride, 4,4'-azobis(4-cyanopentanoic acid) and the like, which have, within their molecule, an amidino, carboxyl or the like group highly reactive with the above-mentioned reactive group, are more preferred. Generally, the polymerization catalyst is used in an amount of 0.01–5 parts by weight per 100 parts by weight of the polymerizable monomer composition.

As mentioned above, the aqueous crosslinkable resin dispersion is obtained by emulsion-polymerizing a monomer composition comprising, as an essential component thereof, a polymerizable monomer having a group reactive with a carboxyl group using as the emulsifier a polymer having a side-chain carboxyl group and a terminal long-chain alkyl thio group and/or a salt thereof. Therefore, the polymer formed by emulsion polymerization and the emulsifier can be bound to each other to form a crosslinked product. The polymers and their salts belonging to the groups (P) and (Q), which are used in accordance with the invention, serve as emulsifiers in the step of emulsion polymerization, enabling formation of a stable emulsion, and, in the step of film formation as a result of evapoaration of water, they behave as crosslinking agents, serving to convert the films to three-dimensionally crosslinked ones. The crosslinking reaction can proceed smoothly even at room temperature and can proceed more smoothly under heating. Heating at 60°–130° C. is generally sufficient. Such high temperatures exceeding 150° C. as in the case of crosslinking of known melamine resins are not necessary. The aqueous crosslinkable resin dispersion according to the invention can form films excellent in water resistance, solvent resistance, durability, heat resistance and adhesion, since, as mentioned above, the polymer formed by emulsion polymerization can integrate with the emulsifier to form a crosslinked product without leaving low-molecular-weight hydrophilic emulsifier residues in the films.

The aqueous crosslinkable resin dispersion per se is thus excellent in performance and can be used as a coating composition, adhesive, textile-finishing composition and so forth. It is possible to produce further improvements in adhesion and heat resistance and/or give antistatic property to thereby increase the utility of said dispersion by adding a metal oxide and/or metal hydroxide in the form of fine particles (hereinafter, fine-particle material) thereto to give an aqueous composition. The fine-particle material to be used here is a fine-particle hydroxide or oxide containing one or more metals represented by the chemical symbols of elements Si, Ti, Al, Sb, Zr, Ce, V, Nb, Ga, In, Fe, Mn, Ni, Co, Ta, Sn, Mg and W, and the particle size of single particles is within the range of 1 to 1,000 nm. Said single particles may be either primary particles or their aggregates, namely secondary particles, and the fine-particle material can be used in the form of a powder or in the state of a sol dispersed in water and/or an organic solvent for example a hydrosol or organosol. The fine-particle material may consist of a single metal hydroxide or oxide or a compound hydroxide or oxide containing two or more metal species. In particular, aqueous colloidal silica is most preferred since it is well compatible with the aqueous crosslinkable resin dispersion, excellent in performance and readily available.

Aqueous colloidal silica is silicic acid condensate. Its particle size is preferably within the range of 5–100 m$\mu$, in particular 7–50 m$\mu$. Those commercial products which are usually supplied in the form of aqueous dispersions can be used as they are. As such aqueous colloidal silica products, there may be mentioned such commercial products as "Snowtex O", "Snowtex N", "Snowtex NCS", "Snowtex 20" and "Snowtex C" (all being products of Nissan Chemical Industries), "Cataloid SN" and "Cataloid Si-500" (both being products of Catalysts and Chemicals Industries) as well as surface-treated colloidal silica, for example aluminic acid-treated "Cataloid SA" (product of Catalysts and Chemicals Industries). One or more selected from among these can be used.

The fine-particle material is used in an amount of 1–200 parts by weight per 100 parts by weight (on the solids basis) of the aqueous crosslinkable resin dispersion. When said material is used in an amount outside of the above range, no effects will be produced or the balance among performance characteristics will be disadvantageously disturbed. In cases where a fine-particle material is used in combination, it is particularly preferable that the aqueous crosslinkable resin dispersion be one produced using an organic silicon-containing monomer. Since a hydrolyzable group involving silicon as derived from the organic silicon-containing monomer is introduced into the polymer and improved the compatibility between the polymer and the fine-particle material, the fine-particle material and the polymer can form a more closely and intimately bound composite material and, as a result, the characteristic features of the aqueous composition according to the invention can be enjoyed more fully. Said aqueous composition can be prepared by merely mixing the aqueous crosslinkable resin dispersion with a fine-particle material, if necessary with heating, or by producing the aqueous crosslinkable resin dispersion in the presence of a fine-particle material.

The mucosity, wetting of various base materials or substrates, adhesiveness and other properties can be more improved and the utility in various fields of application can be increased when an aqueous resin composition is derived from the aqueous crosslinkable resin dispersion by adding thereto a water-soluble resin. The water-soluble resin to be used here includes water-soluble resins selected from among starch, cellulose, casein, polyvinyl alcohol, polyester compounds, polyether compounds, polyamide compounds, polyamine compounds, and water-soluble derivatives of these. Particularly preferred among them is polyvinyl alcohol. Polyvinyl alcohol can interact with the aqueous crosslinkable resin dispersion according to the invention in a unique manner, adjusting the viscosity of said dispersion in a favorable manner and effectively and greatly improving the stability, ability to wet various substances, and adhesion thereto of said dispersion as well as the film strength. Various polyvinyl alcohol species differing in degree of polymerization and degree of saponification over a wide range can be used effectively. Preferably, however, the polyvinyl alcohol species to be used in accordance with the invention should have a degree of polymerization of 200–3,500 and a degree of saponification of 70–100 mole percent.

The water-soluble resin is used preferably in an amount of 0.001–100 parts by weight, more preferably 0.01–50 parts by weight, per 100 parts by weight (on the solids basis) of the aqueous crosslinkable resin dispersion. If the water-soluble resin is used in an amount below 0.001 part by weight, the effects of addition thereof will be insignificant, whereas, in amounts exceeding 100 parts by weight, the excellent performance characteristics of the aqueous crosslinkable resin dispersion may not be enjoyable to the full.

The aqueous resin composition can be produced, for example by the following methods (1) to (3): (1) Mixing the aqueous crosslinkable resin dispersion with a water-soluble resin; (2) Preparing the aqueous crosslinkable resin dispersion by emulsion-polymerizing the corresponding polymerizable monomers in the presence of a water-soluble resin; and (3) Treating the aqueous crosslinkable resin dispersion and a water-soluble resin in the presence of a radical polymerization catalyst. For the purpose of improving the water resistance of the aqueous resin composition, the methods (2) and (3) are preferred. Preferred as the radical polymerization catalyst to be used in emulsion polymerization in carrying out the method (2) and as the radical polymerization catalyst to be used in carrying out the method (3) are those possibly capable of causing a hydrogen abstraction reaction, for example peroxides such as hydrogen peroxide, di-t-butyl peroxide, peracetic acid and persulfates.

A water-dispersible composition obtained by adding 1–200 parts by weight of a metal oxide and/or metal hydroxide in the form of fine particles and 0.001–100 parts by weight of a water-soluble resin to 100 parts by weight (on the solids basis) of the aqueous crosslinkable resin dispersion has the characteristic features of the above-mentioned aqueous composition and those of the aqueous resin composition combinedly and can exhibit its performance characteristics effectively when used in various applications such as mentioned below.

The aqueous crosslinkable resin dispersion, aqueous composition, aqueous resin composition and water-dispersible composition according to the present invention (hereinafter also referred to as "aqueous dispersion and other compositions" or the like), as they are, can be used as coating compositions. If necessary, they may further contain known additives or the like, such as pigments, fillers, thickeners, pH adjusting agents, ultraviolet absorbers, crosslinking agents, film formation auxiliaries, penetrants, wetting agents and antistatic agents, each in an appropriate amount.

The coating compositions according to the invention have advantageous characteristic features. They are excellent in adhesiveness to various substrates, water resistance, moisture resistance and durability, free from the risk of fire or environmental pollution because of their being aqueous dispersions or the like, and less subject to foaming and easier to handle as compared with aqueous resin dispersions or the like produced by using known low-molecular-weight emulsifiers. Therefore, the coating compositions according to the invention can be utilized very effectively as coating compositions for metals, wood, inorganic building materials, plastics, paper, and so forth. When, for instance, they are used as coating compositions for metal substrates, such as stainless steel sheets, galvanized sheets aluminum sheets, or woody substrates, such as plywoods, wood floorings and woody wall materials, coatings excellent in appearance, adhesion, water resistance and durability can be obtained. In a most preferred example, where the coating compositions according to the invention are applied to inorganic substrates, said compositions can exhibit their characteristic features to the fullest extent. The coating compositions according to the invention are excellent in adhesion to various inorganic building materials and in water resistance, hence the films formed therefrom will not swell or peel off even when moistened with water. They can also avoid white coating formation, which is a problem encountered with cement-based building materials. Thus, a beautiful appearance can be maintained for a prolonged period. Furthermore, when they are used as coating compositions for exterior building materials, the deterioration in physical properties will be minimum owing to their excellent durability characteristics. Therefore, when applied to floors, walls or ceilings finished with cement, mortar and concrete or to gypsum boards, asbestos slates, asbestos boards, precast concrete substrates, light-weight aerated concrete substrates, fiber-reinforced concrete substrates, thick slates, asbestos cement-calcium silicate plates, glass sheets, tiles, bricks, fired roofings, and other inorganic building materials, said compositions can serve as coating compositions or primers intended, for instance, to protect substrates, provide beautiful appearance, give water resistance and protect against dust, and can exhibit their excellent performance characteristics.

The coating compositions according to the invention are particularly effective in coating plastics as well. For example, they show good adhesiveness to substrates made of various general-purpose plastics and engineering plastics, inclusive of plastics resistant to adhesion, such as polyethylene terephthalate, and the coat films obtained therefrom are excellent in performance characteristics such as water resistance, hot water resistance, durability and antistatic property. Therefore, the coating compositions according to the invention are useful as primers for polyethylene terephthalate film printing, aluminum vapor deposition and magnetic coating, and as vehicles for antistatic treatment and surface-roughening coating. They can also be used effectively as coating compositions for ornamentation, protection and/or functionalization of moldings and sheet films made of ABS, polyolefins, polycarbonates, acrylic resins, polybutylene terephthalate and other synthetic resins. When applied to polyester films, among others, they can produce marked effects, providing polyester films excellent in affinity for or compatibility with various printing inks, metal vapor deposited films, magnetic coatings and so forth. In applying the coating compositions according to the invention to polyester films, it is particularly suitable to use said compositions in the form of aqueous resin compositions composed of the aqueous crosslinkable resin dispersion and polyvinyl alcohol. When said aqueous resin compositions are used as coating compositions, polyester films are wet well with them and smooth and uniform coating layers can be formed. For the production of polyester films having a coat layer having a minimum required thickness to protect the substrates, namely polyester films, against dust and allow the desired performance characteristics to be exhibited by using the coating compositions according to the invention, it is effective to produce them by a method (in-line coating process) which comprises applying the coating compositions to melt-extruded polyester films not yet fully stretched to a desired extent and then completing the stretching. The polyester films not yet fully stretched include, among others, unstretched films, uniaxially stretched films (films stretched in one direction only) and low ratio stretched films stretched only to a stretching ratio lower than the desired one. A production method which is particularly preferred from the economy and coating layer quality viewpoints comprises stretching melt-extruded polyester resin sheets or films in the longitudinal direction to a desired stretching ratio, applying the coating compositions according to the invention to the same, then stretching the same in the lateral direction to a desired ratio, and fixing the same thermally.

The coating compositions according to the invention are also useful in paper coating. The coating compositions have good affinity for various inorganic fillers conventionally used in paper coating compositions and for inorganic porous particles and others used in the ink-absorbing layer of ink jet recording paper sheets and at the same time give coatings having good water resistance and, therefore, are useful as binders in various paper coating compositions. They are also suited for use as over coat compositions, under coat compositions, back coat compositions and so forth in the manufacture of pressure-sensitive recording paper and heat-sensitive recording paper, where the excellent water resistance and heat resistance can be utilized efficiently.

The coating compositions according to the invention, when applied, as over coat compositions, onto the heat-sensitive color-developing layer of heat-sensitive recording paper, can provide very excellent performance characteristics. For their use as over coat compositions, the over coat compositions are prepared by adding a crosslinking agent and a filler to the aqueous crosslinkable resin dispersion obtained by emulsion-polymerizing the monomer composition [I] which contains an organic silicon-containing monomer. In that case, further addition of polyvinyl alcohol gives over coat compositions which can give heat-sensitive recording paper excellent in smoothness. Furthermore, the use of over coat compositions supplemented with colloidal silica preferably gives heat-sensitive recording paper more improved in heat resistance. As the above-mentioned crosslinking agent, those that can react at temperatures as low as possible are preferred and, for example, methylolurea, methylolmelamine, methylolguanamine and the like polymethylol compounds; glyoxal, glutaraldehyde, dialdehyde starch and the like polyaldehyde compounds; polyethylene glycol diglycidyl ether, glycerol diglycidyl ether, trimethylolpropane diglycidyl ether and the like nonionic water-soluble epoxy compounds; water-soluble copolymers of acrylic or methacrylic acid glycidyl ester and acrylamide or the like; polyamide epoxy resins; boric acid, borates; zirconium compounds of the chemical formulas $Na_2ZrSiO_2$, $ZrOCa_2 \cdot 3H_2O$, $ZrOSO_4 \cdot nH_2O$, $ZrO(NO_3)_2 4H_2O$, $ZrO(CO_3)_2 \cdot nH_2O$, $ZrO(OH)_2 \cdot nH_2O$, $ZrO(C_2H_2O)_2$, $(NH_4)_2ZrO(CO_3)_2$ and $ZrSiO_4$; and others can be used. As the filler mentioned above, there may be mentioned, for example, inorganic fine-particle materials, such as calcium carbonate, silica, zinc oxide, titanium oxide, aluminum hydroxide, zinc hydroxide, barium sulfate, clay, talc, and surface-treated calcium or silica, as well as organic fine-particle materials, such as urea-formalin resins, styrene-methacrylic acid copolymers and polystyrene resins. Heat-sensitive recording paper having improved water resistance and solvent resistance, good storability and high glossiness can be obtained by forming such an overcoat layer on the heat-sensitive color-developing layer. In this case, the use, as the support member, of polyolefin-based resin synthetic paper produced by the film method is preferable, since said synthetic paper is superior in strength, smoothness and water resistance to paper species obtained from nature-derived cellulose fibers, for instance. When such film-method polyolefin-based resin synthetic paper is used, coating compositions supplemented with polyvinyl alcohol are used as the over coat compositions. The film-method polyolefin-based resin synthetic paper mentioned above include monolayer structure films obtained by admixing a filler and additives (stabilizer, dispersant, etc.) with a polyolefin-based resin, melting and kneading the compound in an extruder, extruding the melt through a die slit and subjecting the extrudate to simultaneous or successive biaxial stretching, as well as multilayer structure films comprising a substrate layer, a paper-like layer and optionally a surface layer.

The aqueous dispersions and other compositions according to the invention are useful as textile finishing compositions. Since they are excellent in adhesiveness to natural or synthetic, organic or inorganic fibers, they can be used as binders for nonwoven fabrics and paper made of such fibers and as surface treating compositions, adhesives and other compositions to be applied to cloths, paper and other textile products made of said fibers.

When organic fibers, such as cotton, wool, acrylic fibers, polyester fibers, nylon fibers and rayon fibers, are the targets of application, they can be used as binders for various nonwoven fabrics for clothing or industrial use, binders for use in textile printing, binders for use in flocking, back coat compositions for carpets, coating compositions for coated fabrics having a coat layer provided for the purpose of modifying the feeling and/or waterproofing, and adhesives for manufacturing cloth-cloth or clothfilm bonded fabrics, among others, to give products or articles excellent in water resistance, washability and durability. They can be used safely in products to be used as articles of clothing since they will not generate formalin in the heating treatment step or steps in the course of their processing. When the targets of application are inorganic fibers, they are useful as binders for bundling or collecting inorganic fibers, such as glass fibers, mineral fibers and ceramic fibers, and as binders for use in the manufacture of nonwoven fabrics, paper, waddings and others from such fibers.

Thus, for instance, they can be effectively used as binders in the manufacture of wet or dry method glass fiber mats useful as reinforcements for printed circuit substrates, separators for use in less storage batteries, etc.; wet or dry method glass paper or ceramic paper species useful as air filters, etc.; chopped strands, robings or yarns made of inorganic fibers and useful as reinforcements for various composite materials; rock wool or glass wool useful as a thermal insulator; and other inorganic fiber nonwoven fabrics or woven fabrics, or inorganic fiber bundles.

The aqueous dispersions and other compositions according to the present invention may be used, as they are, as textile finishing compositions. If necessary, however, known additives or auxiliaries, such as pH adjusting agents, viscosity control agents, coupling agents, lubricants, antistatic agents, water-repellents, crosslinking agents, ultraviolet absorbers, penetrants, pigments and dyes, may be added. Said compositions may be used after an adequate dilution.

The aqueous dispersions and other compositions according to the invention are useful as adhesives. Since they have good adhesiveness to various substrates, they are suited for use as adhesives for metals, wood, paper, films, inorganic materials, etc. In particular, when the polymer obtained by polymerizing the monomer composition [I] has a glass transition temperature within the range of $-80°$ to $0°$ C., preferably $-70°$ to $-30°$ C., the compositions are effective as pressure-sensitive adhesives.

The pressure-sensitive adhesives in which the aqueous dispersions and other compositions according to the invention are used are excellent not only in adhesion in the dry state but also in water resistance and moisture resistance. Therefore the adhesive layer will not undergo whitening or blushing even when immersed in water. Furthermore, even under high humidity conditions, the adhesion and creep resistance will not be decreased. Therefore, said adhesives can be applied in those fields in which high performance characteristics are required, where the conventional adhesives cannot be used. In addition, excellent adhesion can be achieved with them even at low temperatures and repeelability can be provided with them, they can be used in various fields where these characteristics are demanded. Thus, they are very useful as adhesives for paper-, cloth- or plastic-based adhesive labels, adhesive tapes, and adhesive sheets.

The aqueous dispersions and other compositions according to the invention can be used, as they are, as adhesives. If necessary, however, known additives or auxiliaries, such as pH adjusting agents, viscosity control agents, crosslinking agents, tackifiers, wetting agents, lubricants, ultraviolet absorbers and film-forming auxiliaries, may be added thereto.

In uniting bodies by using the aqueous dispersions and other compositions according to the invention as adhesives, any method can be used without any particular limitation. As one effective means of increasing the bond strength, there may be mentioned heating of the body-body assemblies bonded by the intermediary of the adhesives to a temperature above the glass transition temperature of the aqueous crosslinkable resin.

The aqueous dispersions and other compositions according to the invention are useful as binder components of coating compositions for heat-sensitive color-developing layer formation. So far, water-soluble resins, such as polyvinyl alcohol, have been used as binder components of coating compositions for heat-sensitive color-developing layer formation. However, they can give only poor water resistance and, therefore, when the image-developed (i.e. thermally recorded) side becomes wet with water, the characters and figures may partly or wholly disappear or become unreadable disadvantageously. On the contrary, this drawback can be overcome and heat-sensitive recording media having good water resistance can be obtained by using the aqueous dispersions and other compositions according to the present invention. While the support member for heat-sensitive recording media may be optional, the use of paper is advantageous from the price and application range viewpoints. For obtaining transparent heat-sensitive recording media, the use of polyester films and the like plastic films is recommendable. When a pressure-sensitive color developing system is used in lieu of the heat-sensitive color-developing system, pressure-sensitive recording media, also of high quality, can be obtained. In this mode of application, other known additive or additives can optionally be used in addition to the aqueous dispersions and other compositions according to the invention and the heat- or pressure-sensitive color-developing components.

The following examples are given for the purpose of illustrating the present invention and they should not be used for limiting the scope of the invention. In the following, "part(s)" and "%" are "part(s) by weight" and "% by weight", respectively.

EXAMPLE 1

Emulsifier Production

A flask equipped with a dropping funnel, stirrer, nitrogen inlet tube, thermometer and reflux condenser was charged with 180 parts of isopropyl alcohol, and the contents were heated to 80° C. while nitrogen gas was blown into the flask gently. Then, thereto was added dropwise over 1.5 hours a polymerizable monomer mixture composed of 174 parts of acrylic acid, 36 parts of n-dodecylmercaptan and 0.42 part of 2,2'-azobisisobutyronitrile (hereinafter referred to as AIBN). During the dropping, the temperature was maintained at 80°-85° C. and, after completion of the dropping, the resultant mixture was stirred at the same temperature for 1 hour for driving the polymerization to completion. To the thus-obtained polymer composition were further added 57 parts of allyl glycidyl ether and 21 parts of triethylbenzylammonium chloride, the resultant mixture was heated to 85° C., and the reaction was conducted at the same temperature for 6 hours to give a 57% solution of emulsifier E-1. Acid value measurement confirmed that the reaction had been completed. The number average molecular weight of emulsifier E-1 was 1,500 and the acid value thereof was about 400.

EXAMPLE 2

Emulsifier Production

The same flask as used in Example 1 was charged with 180 parts of isopropyl alcohol, which was then heated to 80° C. under nitrogen. Thereto was added dropwise over 2.0 hours a polymerizable monomer mixture composed of 148 parts of acrylic acid, 31 parts of itaconic acid, 18 parts of 2-ethylhexyl acrylate, 24 parts of n-octylmercaptan and 0.41 part of AIBN. After completion of the dropping, the resultant mixture was stirred under reflux for 1 hour for driving the polymerization to completion. To the thus-obtained polymer was added 77 parts of 2-aziridinylethyl methacrylate, and the mixture was refluxed for 4 hours to give a 62% solution of emulsifier E-2. The number average molecular weight of said emulsifier E-2 was 1,800 and the acid value thereof was about 380.

EXAMPLE 3

Emulsifier Production

The same flask as used in Example 1 was charged with 180 parts of isopropyl alcohol, which was then heated to 80° C. under nitrogen. Subsequently, a polymerizable monomer mixture prepared in advance and composed of 125 parts of acrylic acid, 100 parts of 2-hydroxyethyl acrylate, 36 parts of n-dedecylmercaptan, 30 parts of isopropyl alcohol and 0.30 part of AIBN was added dropwise over 1 hour for effecting polymerization. After completion of the dropping, the mixture was matured under reflux for 1 hour for driving the polymerization to completion. To the thus-obtained polymer was further added 56 parts of 2-isopropenyl-2-oxazoline, and the mixture was refluxed for 6 hours to give a 60% solution of emulsifier E-3. The number average molecular weight of said emulsifier E-3 was 1,800 and the acid value thereof was about 220.

EXAMPLE 4

Emulsifier Production

The procedure of Example 1 was repeated in the same manner except that the reaction with allyl glycidyl ether was omitted. Thus was obtained a 54% solution of emulsifier E-4 which had no polymerizable unsaturated group. The number-average molecular weight of said emulsifier E-4 was 1,200 and the acid value thereof was about 640.

EXAMPLE 5

Emulsifier Production

The same flask as used in Example 1 was charged with 180 parts of isopropyl alcohol, which was then heated to 80° C. under nitrogen. Thereto was added dropwise over 2 hours a polymerizable monomer mixture composed of 144 parts of acrylic acid, 119 parts of Blemmer PE-200 (a methacrylate having the structure

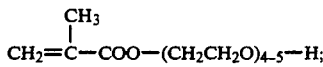

product of Nippon Oil and Fats Co., Ltd), 36 parts of n-dodecylmercaptan and 0.3 part of AIBN. After completion of the dropping, the mixture was matured under reflux for 3 hours for driving the polymerization to completion to give a 62% solution of emulsifier E-5. The number average molecular weight of said emulsifier E-5 was 1,700 and the acid value thereof was about 370.

COMPARATIVE EXAMPLE 1

The procedure of Example 4 was repeated in the same manner except that the polymerizable monomer mixture used was composed of 86 parts of acrylic acid, 139 parts of 2-hydroxyethyl acrylate, 14 parts of thioglycol and 0.3 part of AIBN. Thus was obtained emulsifier e-1 for comparison. Said emulsifier e-1 for comparison had an acid value of 280 and a number average molecular weight of 1,400. It had no terminal long-chain alkyl group, hence was outside of the scope of the present invention.

COMPARATIVE EXAMPLE 2

The procedure of Example 4 was repeated in the same manner except that the polymerizable monomer mixture used was composed of 25 parts of acrylic acid, 106 parts of 2-hydroxyethyl acrylate, 46 parts of methyl methacrylate, 23 parts of dedecylmercaptan and 0.3 part of AIBN. Thus was obtained emulsifier e-2 for comparison. Said emulsifier e-2 for comparison had an acid value of 96, hence was outside the scope of the present invention.

EXAMPLE 6

Production of Aqueous Crosslinkable Resin Dispersion

A flask equipped with a dropping funnel, stirrer, nitrogen inlet tube, thermometer and condenser was charged with 146 parts of deionized water, 4 parts of the solution of emulsifier E-4 as obtained in Example 4 and 1.6 parts of 28% aqueous ammonia, and the resultant mixture was heated at 65° C. in a gentle nitrogen gas stream. Thereinto was poured 4 parts of a 5% aqueous solution of 2,2'-azobis(2-amidinopropane) dihydrochloride. Then, a monomer composition prepared in advance and composed of 47 parts of methyl methacrylate, 50 parts of ethyl acrylate and 3 parts of glycidyl methacrylate was added dropwise from the dropping funnel over 2 hours. After completion of the dropping, stirring was continued for 1 hour while the temperature was maintained at 65° C. The reaction mixture was then cooled to give a crosslinkable resin-containing aqueous dispersion R-1 with a nonvolatile matter content of 39.8%.

EXAMPLES 7–24 AND COMPARATIVE EXAMPLES 3–17

Production of Aqueous Crosslinkable Resin Dispersions

Aqueous crosslinkable resin dispersions R-2 to R-19 and aqueous resin dispersions r-1 to r-13 for comparison were obtained by repeating the procedure of Example 6 in the same manner except that the kind and amount of emulsifier and the monomer components were changed as shown in Tables 1—1 to 1-3.

In Comparative Examples 16 and 17, in which emulsifiers e-1 and e-2 for comparison were respectively used as the emulsifier, aggregates formed in large amounts in the course of emulsion polymerization and therefore the polymerization could not be continued any longer.

TABLE 1-1

| No. | Aqueous crosslinkable resin dispersion | Monomer components (parts) | | Emulsifier | | Nonvolatile matter (%) |
| | | | | No. | Amount (parts) | |
| --- | --- | --- | --- | --- | --- | --- |
| Example 6 | R-1 | Methyl methacrylate | 47 | E-4 | 4 | 39.8 |
| | | Ethyl acrylate | 50 | | | |

TABLE 1-1-continued

| No. | Aqueous crosslinkable resin dispersion | Monomer components (parts) | | Emulsifier No. | Amount (parts) | Nonvolatile matter (%) |
|---|---|---|---|---|---|---|
| Example 7 | R-2 | Glycidyl methacrylate | 3 | E-1 | 6 | 40.1 |
| | | Styrene | 68 | | | |
| | | Butyl acrylate | 28 | | | |
| | | 2-Isopropenyl-2-oxazoline | 4 | | | |
| Example 8 | R-3 | Methyl methacrylate | 60 | E-2 | 10 | 40.6 |
| | | 2-Ethylhexyl acrylate | 34 | | | |
| | | 2-Aziridinylethyl methacrylate | 1 | | | |
| | | Vinyltriethoxysilane | 5 | | | |
| Example 9 | R-4 | Methyl methacrylate | 66 | E-3 | 5 | 40.2 |
| | | Butyl acrylate | 26 | | | |
| | | Glycidyl methacrylate | 5 | | | |
| | | Vinyltrimethoxysilane | 3 | | | |
| Example 10 | R-5 | Methyl methacrylate | 42 | E-4 | 8 | 40.0 |
| | | Ethyl acrylate | 56 | | | |
| | | 2-Aziridinylethyl methacrylate | 2 | | | |
| Example 11 | R-6 | Methyl methacrylate | 35 | E-3 | 4 | 39.9 |
| | | Styrene | 30 | | | |
| | | Butyl acrylate | 32 | | | |
| | | Glycidyl methacrylate | 3 | | | |
| Example 12 | R-7 | Methyl methacrylate | 60 | E-2 | 6 | 40.2 |
| | | Butyl acrylate | 36 | | | |
| | | Glycidyl methacrylate | 2 | | | |
| | | Vinyltrimethoxysilane | 2 | | | |
| Example 13 | R-8 | Ethyl acrylate | 98 | E-5 | 10 | 40.6 |
| | | Glycidyl methacrylate | 2 | | | |
| Example 14 | R-9 | Vinyl acetate | 15 | E-1 | 6 | 40.2 |
| | | Styrene | 15 | | | |
| | | Butyl acrylate | 66 | | | |
| | | 2-Vinyl-2-oxazoline | 4 | | | |
| Example 15 | R-10 | Methyl methacrylate | 35 | E-2 | 5 | 40.2 |
| | | Butyl acrylate | 60 | | | |
| | | 2-Aziridinylethyl methacrylate | 2 | | | |
| | | Vinyltriethoxysilane | 3 | | | |
| Example 16 | R-11 | Butyl acrylate | 99 | E-1 | 9 | 40.3 |
| | | Glycidyl methacrylate | 1 | | | |

TABLE 1-2

| No. | Aqueous crosslinkable resin dispersion | Monomer components (parts) | | Emulsifier No. | Amount (parts) | Nonvolatile matter (%) |
|---|---|---|---|---|---|---|
| Example 17 | R-12 | Vinyl acetate | 5 | E-4 | 12 | 41.0 |
| | | Butyl acrylate | 93.5 | | | |
| | | 2-isopropenyl-2-oxazoline | 1.5 | | | |
| Example 18 | R-13 | Vinyl acetate | 5 | E-3 | 14 | 40.0 |
| | | 2-Ethylhexyl acrylate | 94.3 | | | |
| | | 2-Aziridinylethyl methacrylate | 0.3 | | | |
| | | Vinyltrimethoxysilane | 0.4 | | | |
| Example 19 | R-14 | Methyl methacrylate | 38 | E-4 | 7 | 40.4 |
| | | Ethyl acrylate | 50 | | | |
| | | Glycidyl methacrylate | 12 | | | |
| Example 20 | R-15 | Styrene | 50 | E-1 | 12 | 40.3 |
| | | Butyl acrylate | 40 | | | |
| | | 2-Isopropenyl-2-oxazoline | 8 | | | |
| | | γ-Methacryloyloxypropyltrimethoxysilane | 2 | | | |
| Example 21 | R-16 | Acrylonitirile | 10 | E-2 | 6 | 40.7 |
| | | Methyl methacrylate | 53 | | | |
| | | Butyl acrylate | 31 | | | |
| | | Ethylene glycol dimethacrylate | 2 | | | |
| | | 2-Aziridinylethyl methacrylate | 3 | | | |
| | | Vinyltrimethoxysilane | 1 | | | |
| Example 22 | R-17 | Styrene | 15 | E-4 | 18 | 40.7 |
| | | Methyl acrylate | 83 | | | |
| | | 2-Isopropenyl-2-oxazoline | 2 | | | |
| Example 23 | R-18 | Methyl methacyrlate | 27 | E-3 | 5 | 40.1 |
| | | Ethyl acrylate | 66 | | | |
| | | Glycidyl methacrylate | 2 | | | |
| | | γ-Methacryloyloxypropyltrimethoxysilane | 5 | | | |
| Example 24 | R-19 | Methyl methacrylate | 39 | E-5 | 9 | 40.6 |
| | | Buthyl acrylate | 49 | | | |
| | | Glycidyl methacrylate | 2 | | | |
| | | Vinyltrimethoxyethoxysilane | 10 | | | |
| Comparative Example 3 | r-1 for comparison | Methyl methacrylate | 47 | Sodium dodecylbenzenesulfonate | 3 | 40.5 |
| | | Ethyl acrylate | 50 | | | |
| | | Glycidyl methacrylate | 3 | | | |

TABLE 1-2-continued

| No. | Aqueous crosslinkable resin dispersion | Monomer components (parts) | | Emulsifier No. | Amount (parts) | Nonvolatile matter (%) |
|---|---|---|---|---|---|---|
| Comparative Example | r-2 for comparison | Methyl methacrylate<br>Styrene<br>Butyl acrylate | 35<br>30<br>32 | Sodium dodecyl sulfate | 2 | 40.3 |

TABLE 1-3

| No. | Aqueous crosslinkable resin dispersion | Monomer components (parts) | | Emulsifier No. | Amount (parts) | Nonvolatile matter (%) |
|---|---|---|---|---|---|---|
| Comparative Example 5 | r-3 for comparison | Vinyl acetate<br>Styrene<br>Butyl acrylate<br>2-Vinyl-2-oxazoline | 15<br>15<br>66<br>4 | Nonipol 400 (Note 1) | 8 | 41.3 |
| Comparative Example 6 | r-4 for comparison | Butyl acrylate<br>Glycidyl methacrylate | 99<br>1 | Sodium dodecylbenzenesulfate | 2 | 40.3 |
| Comparative Example 7 | r-5 for comparison | Methyl methacrylate<br>Ethyl acrylate<br>Glycidyl methacrylate | 38<br>50<br>12 | Sodium dodecyl sulfate | 2 | 40.2 |
| Comparative Example 8 | r-6 for comparison | Methyl methacrylate<br>Ethyl acrylate<br>Glycidyl methacrylate<br>γ-Methacryloyloxypropyltrimethoxysilane | 27<br>66<br>2<br>5 | Sodium dodecyl sulfate | 2 | 40.2 |
| Comparative Example 9 | r-7 for comparison | Methyl methacrylate<br>Ethyl acrylate | 50<br>50 | E-4 | 4 | 40.0 |
| Comparative Example 10 | r-8 for comparison | Methyl methacrylate<br>Styrene<br>Butyl acrylate | 35<br>30<br>35 | E-3 | 4 | 40.0 |
| Comparative Example 11 | r-9 for comparison | Vinyl acetate<br>Styrene<br>Butyl acrylate | 15<br>15<br>70 | E-1 | 6 | 40.1 |
| Comparative Example 12 | r-10 for comparison | Butyl acrylate | 100 | E-1 | 9 | 40.3 |
| Comparative Example 13 | r-11 for comparison | Methyl methacrylate<br>Ethyl acrylate | 45<br>55 | E-4 | 7 | 40.1 |
| Comparative Example 14 | r-12 for comparison | Methyl methacrylate<br>Ethyl acrylate | 30<br>70 | E-3 | 5 | 40.2 |
| Comparative Example 15 | r-13 for comparison | Methyl methacrylate<br>Butyl acrylate<br>Glycidyl methacrylate | 30<br>20<br>50 | E-4 | 10 | 40.2 |
| Comparative Example 16 | — (No resin dispersion obtained) | Methyl methacrylate<br>Butyl acrylate<br>Glycidyl methacrylate | 50<br>47<br>3 | e-1 for comparison | 10 | — |
| Comparative Example 17 | — (No resin dispersion obtained) | Methyl methacrylate<br>Butyl acrylate<br>Glycidyl methacrylate | 50<br>47<br>3 | e-2 for comparison | 10 | — |

(Note 1)
Nonipol 400: Ethylene oxide adduct of nonylphenol, product of Sanyo Chemical Industries, Ltd.

EXAMPLE 25

Production of Aqueous Crosslinkable Resin Dispersion

The same flask as used in Example 6 was charged with 146 parts of deionized water, 4 parts of the solution of emulsifier E-4 and 1.6 parts of 28% aqueous ammonia, and the temperature was raised to 70° C. in a gentle nitrogen gas stream. Thereinto was poured 6 parts of a 5% aqueous solution of 4,4'-azobis(4-cyanopentanoic acid) and, then, a first monomer composition prepared in advance and composed of 23 parts of methyl methacrylate, 25 parts of ethyl acrylate and 2 parts of glycidyl methacrylate was added dropwise over 1 hour. After 30 minutes of stirring, a second polymerizable monomer mixture composed of 23 parts of methyl methacrylate, 25 parts of ethyl acrylate, and 2 parts of vinyltrimethoxysilane was added dropwise over 1 hour. After a further hour of stirring, the reaction mixture was cooled to give an aqueous crosslinkable resin dispersion, R-20, with a nonvolatile matter content of 39.8%.

EXAMPLES 26 AND 27

Aqueous crosslinkable resin dispersions R-21 and R-22 were obtained by repeating the procedure of Example 25 in the same manner except that the emulsifier and first and second monomer compositions used were respectively as shown in Table 2.

TABLE 2

| Example No. | Aqueous crosslinkable resin dispersion | Monomer components (parts) | | Emulsifier No. | Emulsifier Amount (parts) | Nonvolatile matter (%) |
|---|---|---|---|---|---|---|
| 25 | R-20 | First monomer composition | | E-4 | 4 | 39.8 |
| | | Methyl methacrylate | 23 | | | |
| | | Ethyl acrylate | 25 | | | |
| | | Glycidyl methacrylate | 2 | | | |
| | | Second monomer composition | | | | |
| | | Methyl methacrylate | 23 | | | |
| | | Ethyl acrylate | 25 | | | |
| | | Vinyltrimethoxysilane | 2 | | | |
| 26 | R-21 | First monomer composition | | E-1 | 9 | 40.4 |
| | | Methyl methacrylate | 25 | | | |
| | | Ethyl acrylate | 7 | | | |
| | | Glycidyl methacrylate | 1 | | | |
| | | Second monomer composition | | | | |
| | | Methyl methacrylate | 22 | | | |
| | | Ethyl acrylate | 42 | | | |
| | | γ-Methacryloyloxypropyltrimethoxysilane | 3 | | | |
| 27 | R-22 | First monomer composition | | E-1 | 10 | 40.5 |
| | | Methyl methacrylate | 28 | | | |
| | | Ethyl acrylate | 37 | | | |
| | | Trimethylolpropane trimethacrylate | 1 | | | |
| | | Glycidyl methacrylate | 1 | | | |
| | | Second monomer composition | | | | |
| | | Acrylonitrile | 7 | | | |
| | | Methyl methacrylate | 14 | | | |
| | | Butyl acrylate | 11 | | | |
| | | Vinyltrimethoxysilane | 1 | | | |

EXAMPLES 28–34

Production of Aqueous Compositions

Aqueous compositions L-1 to L-7 were obtained by uniformly blending with stirring the corresponding aqueous crosslinkable resin dispersions and fine particle materials shown in Table 3 in a flask equipped with a stirrer at room temperature.

TABLE 3

| Example No. | Aqueous composition No. | Aqueous crosslinkable resin dispersion No. | Aqueous crosslinkable resin dispersion Amount (parts) | Fine particle material Species (Note 1) | Fine particle material Amount (parts) | Nonvolatile matter (%) |
|---|---|---|---|---|---|---|
| 28 | L-1 | R-1 | 250 | Snowtex C | 25 | 38.0 |
| 29 | L-2 | R-3 | 250 | Snowtex C | 50 | 37.5 |
| 30 | L-3 | R-7 | 250 | Snowtex C | 100 | 34.5 |
| 31 | L-4 | R-21 | 250 | Titania sol | 600 | 15.3 |
| 32 | L-5 | R-16 | 250 | Snowtex C | 250 | 30.1 |
| 33 | L-6 | R-22 | 250 | Snowtex C | 350 | 28.5 |
| 34 | L-7 | R-18 | 250 | Snowtex C | 50 | 36.7 |

(Note 1) Species of fine particle material
  Snowtex C: A 20% aqueous dispersion of silica particles 10–20 nm in diameter; product of Nissan Chemical Industries.
  Titania sol: A hydrosol containing 5% of titania particles 2–3 nm in diameter.

EXAMPLE 35

Production of Aqueous Composition

The same flask as used in Example 6 was charged with 146 parts of deionized water, 5 parts of the solution of emulsifier E-3 as obtained in Example 3, 25 parts of Snowtex C and 1.6 parts of 28% aqueous ammonia, and the contents were heated to 65° C. in a gentle nitrogen gas stream. Thereinto was poured 4 parts of a 5% aqueous solution of 2,2'-azobis(2-amidinopropane) dihydrochloride and then, a monomer composition prepared in advance and composed of 61 parts of methyl methacrylate, 26 parts of butyl acrylate, 51 parts of glycidyl methacrylate and 3 parts of vinyltrimethoxysilane was added dropwise from the dropping funnel over 2 hours. After completion of the dropping, stirring was continued for 1 hour while the temperature was maintained at 65° C. Then, the mixture was cooled to give an aqueous composition, L-8, with a nonvolatile matter content of 38.2%.

EXAMPLE 36

Production of Aqueous Composition

The procedure of Example 35 was repeated in the same manner except that Snowtex was used in an amount of 100 parts and that the monomer composition used in this example was composed of 60 parts of methyl methacrylate, 33 parts of butyl acrylate, 2 parts of glycidyl methacrylate and 5 parts of vinyltriethoxysilane. Thus was obtained an aqueous composition, L-9, with a nonvolatile matter content of 34.3%.

EXAMPLE 37

Production of Aqueous Composition

The same flask as used in Example 6 was charged with 146 parts of deionized water, 12 parts of the solution of emulsifier E-4 as obtained in Example 1 and 1.6 parts of 28% aqueous ammonia, and the contents were heated to 65° C. in a gentle nitrogen gas stream. Thereinto was poured 4 parts of a 5% aqueous solution of 2,2'-azobis(2-amidinopropane) dihydrochloride. Then, a monomer composition prepared in advance and composed of 20 parts of styrene, 30 parts of metyl methacrylate, 40 parts of butyl acrylate, 8 parts of 2-isopropenyl-2-oxazoline and 2 parts of γ-methacryloyloxypropyltrimethoxysilane was added dropwise from the dropping funnel over 2 hours. Thereafter, 250 parts of Snowtex C was added, stirring was continued for 2 hours at 65° C., and the mixture was cooled to give an aqueous composition, L-10, with a nonvolatile matter content of 30.0%.

EXAMPLE 38

Production of Aqueous Composition

An aqueous composition, L-11, having a nonvolatile matter content of 35.4% was obtained by repeating the procedure of Example 37 in the same manner except that Snowtex C was used in an amount of 75 parts and that the monomer composition used was composed of 39 parts of methyl methacrylate, 44 parts of butyl acrylate, 5 parts of 2-hydroxyethyl acrylate, 2 parts of glycidyl methacrylate and 10 parts of vinyltrimethoxysilane.

EXAMPLES 39–44

Production of Aqueous Resin Compositions

The aqueous crosslinkable resin dispersion and polyvinyl alcohol species (10% aqueous solution) each specified in Table 4 were uniformly mixed together at room temperature by sufficient stirring. Thus were obtained aqueous resin compositions M-1 to M-6.

TABLE 4

| Example No. | Aqueous composition No. | Aqueous crosslinkable resin dispersion No. | Amount (parts) | 10% Polyvinyl alcohol Species* | Amount (parts) | Nonvolatile matter (%) |
|---|---|---|---|---|---|---|
| 39 | M-1 | R-1 | 250 | Kuraray Poval 117 | 20 | 37.5 |
| 40 | M-2 | R-5 | 250 | Kuraray Poval 117 | 5 | 39.3 |
| 41 | M-3 | R-7 | 250 | Kuraray Poval 217 | 10 | 38.8 |
| 42 | M-4 | R-14 | 250 | Kuraray Poval 217 | 200 | 26.4 |
| 43 | M-5 | R-16 | 250 | Kuraray Poval 205 | 400 | 21.5 |
| 44 | M-6 | R-20 | 250 | Kuraray Poval 117 | 10 | 38.7 |

*Species of polyvinyl alcohol

Kuraray Poval 117: Completely saponified product, degree of polymerization 1,700
Kuraray Poval 217: Partially saponified product, degree of polymerization 1,700
Kuraray Poval 205: Partially saponified product, degree of polymerization 500
(Each is a product of Kuraray Co., Ltd.)

EXAMPLES 45–47

Production of Aqueous Resin Composition

The same flask as used in Example 6 was charged with the aqueous crosslinkable resin dispersion and 10% aqueous polyvinyl alcohol solution each specified in Table 5, and the temperature was raised to 70° C. with stirring in a gentle nitrogen gas stream. Thereto was added 2 parts of a 5% aqueous solution of ammonium persulfate, stirring was then continued at 65° C. for 2 hours, and the mixture was cooled. Thus were obtained aqueous resin compositions M-7 to M-9.

TABLE 5

| Example No. | Aqueous composition No. | Aqueous crosslinkable resin dispersion No. | Amount (parts) | 10% Polyvinyl alcohol Species | Amount (parts) | Nonvolatile matter (%) |
|---|---|---|---|---|---|---|
| 45 | M-7 | R-2 | 250 | Kuraray Poval 117 | 20 | 37.6 |
| 46 | M-8 | R | 250 | Kuraray Poval 217 | 5 | 39.4 |
| 47 | M-9 | R-22 | 250 | Kuraray Poval 217 | 1000 | 26.5 |

EXAMPLE 48

Production of Aqueous Resin Composition

The same flask as used in Example 6 was charged with 146 parts of deionized water, 10 parts of the solution of emulsifier E-5 as obtained in Example 5 and 1.6 parts of 28% aqueous ammonia, and the contents were heated to 65° C. in a gentle nitrogen gas stream. Thereinto was poured 4 parts of a 5% aqueous solution of 2,2'-azobis(2-amidinopropane) dihydrochloride. Then, a monomer composition prepared in advance and composed of 39 parts of methyl methacrylate, 49 parts of butyl acrylate, 2 parts of 2-aziridinylethyl methacrylate and 10 parts of vinyltriethoxysilane was added dropwise from the dropping funnel over 2 hours. Thereto was then added 10 parts of a 10% aqueous solution of Kuraray Poval 117, and the resultant mixture was stirred at 65° C. for 2 hours. The subsequent cooling gave an aqueous resin composition, M-10, with a nonvolatile matter content of 38.8%.

EXAMPLES 49–54

Production of Water-Dispersible Compositions

A flask equipped with a stirrer was charged with the aqueous crosslinkable resin disperison or aqueous composition or aqueous resin composition, polyvinyl alcohol and fine-particle material each specified in Table 6, and the contents were stirred at room temperature sufficiently to give a uniform mixture. Thus were obtained water-dispersible compositions N-1 to N-6.

TABLE 6

| Example No. | Water-dispesible composition No. | Amount of aqueous crosslinkable resin dispersion, etc. (parts) | Amount of 10% polyvinyl alcohol (parts) | Amount of fine-particle material (parts) | Nonvolatile matter (%) |
|---|---|---|---|---|---|
| 49 | N-1 | Aqueous crosslinkable resin dispersion R-1:250 | Kuraray Poval 117:20 | Snowtex C:25 | 36.2 |
| 50 | N-2 | Aqueous composition L-9:350 | Kuraray Poval 117:5 | — | 33.9 |
| 51 | N-3 | Aqueous resin composition M-8:255 | — | Titania sol:400 | 18.4 |
| 52 | N-4 | Aqueous crosslinkable resin dispersion R-22:250 | Kuraray Poval 217:200 | Snowtex C:150 | 25.0 |
| 53 | N-5 | Aqueous resin composition | — | Snowtex C:100 | 25.2 |

TABLE 6-continued

| Example No. | Water-dispesible composition No. | Amount of aqueous crosslinkable resin dispersion, etc. (parts) | Amount of 10% polyvinyl alcohol (parts) | Amount of fine-particle material (parts) | Non-volatile matter (%) |
| --- | --- | --- | --- | --- | --- |
| 54 | N-6 | M-9:450 Aqueous crosslinkable resin composition M-18:250 | Kuraray Poval 205:30 | Snowtex C:50 | 34.2 |

EXAMPLE 55

Testing of Films for Water Resistance

Cast films were prepared from several of the dispersions according to the present invention as obtained in the foregoing examples and tested for water resistance. The results obtained are shown in Table 7. Film preparation The dispersion according to the invention was cast onto a teflon plate to a dry thickness of 0.2–0.3 mm and dried at 20° C. for 1 day. The film thus formed was heated at 130° C. for 3 minutes and used as the test film.

Test Method

Water resistance: A square test specimen (about 20 mm×about 20 mm) was cut from the test film and weighed ($W_0$) It was immersed in deionized water for 3 days, then taken up, wiped lightly to remove the moisture on the surface, and weighed ($W_1$). It was dried at 100° C. for 1 hour, then allowed to cool, and weighed ($W_2$)

The water resistance of the test film was evaluated in terms of the percent water absorption and percent dissolution calculated as follows:

$$\text{Water absorption (\%)} = \frac{W_1 - W_2}{W_2} \times 100$$

$$\text{Dissolution (\%)} = \frac{W_0 - W_2}{W_0} \times 100$$

Film appearance: The film immersed in deionized water for 3 days was evaluated for transparency. The symbols ○, Δ and × given in Table 7 respectively have the following meanings:

○..... Tranparent; no change.
Δ..... Semitransparent
×..... Whitening

TABLE 7

| Aqueous dispersion etc. used for film formation | Water absorption (%) | Dissolution (%) | Film appearance |
| --- | --- | --- | --- |
| Aqueous crosslinkable resin dispersion R-1 | 10.7 | 0.2 | Δ |
| Aqueous crosslinkable resin dispersion R-3 | 8.0 | 0.2 | ○–Δ |
| Aqueous crosslinkable resin dispersion R-4 | 7.8 | 0.1 | ○–Δ |
| Aqueous crosslinkable resin dispersion R-5 | 10.6 | 0.1 | Δ |
| Aqueous crosslinkable resin dispersion R-15 | 9.5 | 0.2 | ○–Δ |
| Aqueous crosslinkable resin dispersion R-17 | 10.6 | 0.2 | Δ |
| Aqueous crosslinkable resin dispersion R-20 | 6.5 | 0.1 | ○ |
| Aqueous composition L-1 | 7.7 | 0.1 | ○–Δ |
| Aqueous composition L-5 | 7.6 | 0.1 | ○ |
| Aqueous composition L-9 | 5.1 | 0.1 | ○ |
| Aqueous resin composition M-3 | 8.1 | 0.2 | ○–Δ |
| Aqueous resin composition M-8 | 7.5 | 0.1 | ○ |
| Water-dispersible composition M-1 | 6.3 | 0.1 | ○ |
| Water-dispersible composition M-2 | 5.9 | 0.1 | ○ |
| Water-dispersible composition M-6 | 4.8 | 0.1 | ○ |
| Aqueous crosslinkable resin dispersion (for comparison) r-1 | 50.5 | 0.9 | × |
| Aqueous crosslinkable resin dispersion (for comparison) r-3 | 68.5 | 1.2 | × |
| Aqueous crosslinkable resin dispersion (for comparison) r-7 | 22.3 | 0.5 | × |
| Aqueous crosslinkable resin dispersion (for comparison) r-15 | 35.3 | 0.2 | × |

EXAMPLE 56

Coating Compositions to be Applied to Inorganic Substrates

The aqueous dispersions and other compositions according to the invention were tested for their performance as coating compositions for inorganic substrates.

Water Resistance Testing as Primers for Colored Pavements

The aqueous dispersions and other compositions according to the invention were each applied uniformly to a 5-mm-thick slate plate in an amount of about 100 g/m² by means of a flat brush. After 2 hours of drying at room temperature, a mixed paint obtained by mixing a colored paint (Nippoly-Color ®R-1; product of Nippon Polyester) with No. 7 silica sand in a weight ratio of 1:1 was applied to the plate in an amount of about 1,000 g/m² by means of a trowel. The coated slate plate was dried for 7 days under conditions of 20° C. and 65% RH (relative humidity) to give a test specimen.

The thus-obtained test specimens, in the original state and after immersion in water, were measured for bond strength according to JIS A 6910. The bond strength after immersion in water was measured after immersion of the test specimen in water at room temperature for 24 hours and the subsequent air drying for 2 hours.

The test results are shown in Table 8. In the operation of coating the slate plates with the dispersion or the like by means of the brush, foaming was slight and the operation was easy with any of the aqueous dispersions and other compositions according to the invention and foam-free paint surfaces were obtained. On the contrary, the aqueous resin dispersion r-1 for comparison often foamed readily, was difficult to handle, and tended to allow foams to remain on the painted surface.

TABLE 8

| Aqueous dispersion etc. | Bond Strength (kg/cm²) | |
|---|---|---|
| | Original state | After immersion in water |
| Aqueous crosslinkable resin dispersion R-1 | 10.8 (Slate broken) | 7.1 |
| Aqueous crosslinkable resin dispersion R-2 | 10.9 (Slate broken) | 7.7 |
| Aqueous crosslinkable resin dispersion R-3 | 11.0 (Slate broken) | 8.2 |
| Aqueous crosslinkable resin dispersion R-4 | 10.9 (Slate broken) | 8.4 |
| Aqueous crosslinkable resin dispersion R-20 | 11.2 (Slate broken) | 9.1 |
| Aqueous composition L-1 | 10.6 (Slate broken) | 8.4 |
| Aqueous composition L-2 | 10.8 (Slate broken) | 8.9 |
| Aqueous composition L-8 | 10.8 (Slate broken) | 9.0 |
| Aqueous resin composition M-1 | 10.7 (Slate broken) | 8.2 |
| Aqueous resin composition M-7 | 10.5 (Slate broken) | 8.5 |
| Water-dispersible composition N-1 | 10.9 (Slate broken) | 9.0 |
| Aqueous resin composition (for comparison) r-1 | 10.0 (Slate broken) | 1.2 |
| Aqueous resin composition (for comparison) r-7 | 10.1 (Slate broken) | 3.5 |

EXAMPLE 57

Overcoating Compositions for Heat-Sensitive Recording Paper Sheets

The coating compositions shown in Table 9 were prepared by using the aqueous dispersions and other compositions according to the invention and adding thereto a filler (in each case, kaolinite clay) and a crosslinking agent. The aqueous dispersions and other compositions according to the invention were used each in an amount of 100 parts as the nonvolatile matter.

TABLE 9

| Coating composition No. | Aqueous dispersion etc. | Filler amount (parts) | Crosslinking agent Kind | Amount (parts) |
|---|---|---|---|---|
| I | Aqueous crosslinkable resin dispersion R-14 | 50 | Water-soluble methylol melamine | 10 |
| II | Aqueous crosslinkable resin dispersion R-15 | 50 | Water-soluble methylol melamine | 10 |
| III | Aqueous crosslinkable resin dispersion R-16 | 50 | Water-soluble methylol melamine | 10 |
| IV | Aqueous crosslinkable resin dispersion R-22 | 50 | Water-soluble methylol melamine | 10 |
| V | Aqueous composition L-5 | 40 | Water-soluble methylol melamine | 10 |
| VI | Aqueous composition L-6 | 40 | Water-soluble methylol melamine | 10 |
| VII | Aqueous composition L-10 | 45 | Water-soluble methylol melamine | 10 |
| VIII | Aqueous resin composition M-1 | 50 | Glyoxal | 10 |
| IX | Aqueous resin composition M-5 | 50 | Glyoxal | 10 |
| X | Aqueous resin composition M-9 | 50 | Boric acid | 0.5 |
| XI | Water-dispersible composition N-4 | 45 | Boric acid | 0.5 |
| XII | Water-dispersible composition N-5 | 45 | Boric acid | 0.5 |
| I for comparison | Aqueous resin dispersion (for comparison) r-5 | 50 | Water-soluble methylol melamine | 10 |
| II for comparison | Aqueous resin dispersion (for comparison) r-11 | 50 | Water-soluble methylol melamine | 10 |

Heat-sensitive recording paper sheets were then prepared in the following manner, with synthetic paper sheets as the supporing members:

[Liquid composition A]
| | |
|---|---|
| 3-N-Methyl-N-cyclohexylamino-6-methyl-7-anilinofluoran | 300 parts |
| 10% Aqueous solution of polyvinyl alcohol | 300 parts |
| Water | 400 parts |

[Liquid composition B]
| | |
|---|---|
| 4,4'-Isopropylidenebis(2,6-dibromophenol) | 300 parts |
| 10% Aqueous solution of polyvinyl alcohol | 200 parts |
| Water | 400 parts |

[Liquid composition C]
| | |
|---|---|
| di-o-chlorophenyl adipate | 100 parts |
| Calcium carbonate | 300 parts |
| 10% Aqueous solution of polyvinyl alcohol | 200 parts |
| Water | 300 parts |

The above compositions were each treated in a sand mill for obtaining a dispersion of a particle size of $0.8\pm0.1$ μm. A coating composition for heat-sensitive color-developing layer formation was prepared from the thus-obtained liquid compositions or dispersions A, B and C by mixing 20 parts of liquid composition A, 70 parts of liquid composition B and 10 parts of liquid composition C together. The coating composition was then applied to a synthetic paper sheet (Yupo FPG 80; product of Oji-Yuka Synthetic Paper) made by the film method from a polyolefin-based resin in a coating amount (after drying) of 5 g/m2 by means of a wire bar coater, and dried to give a heat-sensitive color-developing layer.

The coating compositions I to XII and the coating compositions for comparison I and II were each applied to the surface of the heat-sensitive color-developing layer in an amount (after drying) of 3 g/m² by means of a wire bar coater and then dried to give an overcoat layer.

The overcoat layers thus obtained were treated on a super-calender to a smoothness of 4,000 seconds to give the respective synthetic paper-based heat-sensitive recording paper sheets. The heat-sensitive recording paper sheets thus obtained were measured for sticking resistance, glossiness after allover black color development (incidence angle: 75°), and water resistance.

The results obtained are shown in Table 10. The sticking resistance was evaluated using a Toshiba Medical model TP8300 printer for ultrasonography according to the following criteria:

5: No sticking sound.
4: Almost no sticking sound.
3: Soft sticking sound.
2: Big sticking sound; the coat film is not taken up by the head.
1: Big sticking sound; the coat film is taken up by the head.

For water resistance evaluation, water was dropped on the boundary between the color-developed portion (black) and undeveloped portion, the boundary portion was rubbed with a finger, and the extent of migration of the dye from the color-developed portion was investigated. The symbols ○, Δ and × used in the table respectively have the following meanings:

○: No dissolution from the color-developed portion.
Δ: Slight dissolution from the color-developed portion.
×: Much dissolution from the color-developed portion.

TABLE 10

| Overcoat layer coating composition No. | Aqueous dispersion etc. No. | Sticking resistance | Recording side glossiness | Water resistance |
|---|---|---|---|---|
| I | Aqueous crosslinkable resin dispersion R-14 | 3 | 53 | Δ |
| II | Aqueous crosslinkable resin dispersion R-15 | 4 | 49 | ○–Δ |
| III | Aqueous crosslinkable resin dispersion R-16 | 4 | 52 | ○ |
| IV | Aqueous crosslinkable resin dispersion R-22 | 5 | 50 | ○ |
| V | Aqueous composition L-5 | 4 | 45 | ○ |
| VI | Aqueous composition L-6 | 5 | 43 | ○ |
| VII | Aqueous composition L-10 | 5 | 48 | ○ |
| VIII | Aqueous resin composition M-4 | 4 | 61 | ○–Δ |
| IX | Aqueous resin composition M-5 | 4 | 58 | ○ |
| X | Aqueous resin composition M-9 | 5 | 60 | ○ |
| XI | Water-dispersible composition N-4 | 5 | 58 | ○ |
| XII | Water-dispersible composition N-5 | 5 | 62 | ○ |
| I for comparison | Aqueous resin composition (for comparison) r-5 | 1 | 30 | × |
| II for comparison | Aqueous resin composition (for comparison) r-11 | 1 | 36 | Δ–× |

EXAMPLE 58

Coating Compositions to be Applied to Polyester Films

The aqueous dispersions and other compositions were each applied to a polyester film by the in-line coating method to be mentioned below, and the coat film condition, adhesion and water resistance were evaluated. The results obtained are shown in Table 11.

In-line coating method: Polyethylene terephthalate was melt-extruded and cast onto a cooled rotating drum surface. The cast film was then stretched 3.5 times in the direction of extrusion (longitudinal direction), coated with the aqueous dispersion or the like (diluted with water to a concentration of 3%) by means of a roll coater, stretched 3.5 times laterally, namely in the transverse direction, at 105° C., and thermally fixed at 200° C. to give a coated PET film, which had a film thickness of about 12 μm and a coating layer thickness of about 0.05 μm.

The coated PET films thus obtained were observed for coat film condition. Furthermore, test specimens (15×20 cm) were excised from them, coated with a polyurethane resin to a thickness (after drying) of about 5 μm by means of a bar coater, and dried at 110° C. for 1 minute. The thus-prepared films for testing were tested for adhesion and hot water resistance.

Coat film appearance: The extent of cissing or crawling was evaluated. The symbols ○, Δ and × used in the table mean the following:

○: No cissing or crawling.
Δ: Slight cissing or crawling.
×: Marked cissing or crawling.

Adhesion: A cellophane tape was applied closely to the coated surface and then peeled off at a stroke in the direction of 90°, and the adhesion was evaluated in terms of the extent of peeling off of the coating layer according to the following scoring criteria: 10 points (no peeling) to 1 point (allover peeling).

Hot water resistance: The coated PET films were immersed in hot water at 90–95° C. for 30 minutes, then wiped for removing the surface moisture, and tested for adhesion in the same manner as mentioned above.

TABLE 11

| Aqueous dispersion etc. No. | Film appearance | Adhesion | Hot water resistance |
|---|---|---|---|
| Aqueous crosslinkable resin dispersion R-5 | Δ | 9 | 7 |
| Aqueous crosslinkable resin dispersion R-6 | Δ | 10 | 8 |
| Aqueous crosslinkable resin dispersion R-7 | Δ | 10 | 9 |
| Aqueous crosslinkable resin dispersion R-21 | Δ | 10 | 10 |
| Aqueous composition L-3 | Δ | 10 | 10 |
| Aqueous composition L-4 | Δ | 10 | 10 |
| Aqueous composition L-9 | Δ | 10 | 10 |
| Aqueous resin composition M-2 | ○ | 10 | 9 |
| Aqueous resin composition M-3 | ○ | 10 | 9 |
| Aqueous resin composition M-8 | ○ | 10 | 9 |
| Water-dispersible composition N-2 | ○ | 10 | 10 |
| Water-dispersible composition N-3 | ○ | 10 | 10 |
| Aqueous resin dispersion (for comparison) r-2 | Δ–× | 3 | 1 |
| Aqueous resin dispersion (for comparison) r-8 | Δ | 4 | 1 |
| Film having no coating layer | — | 1 | 1 |

EXAMPLE 59

Coating Compositions to be Applied to Plastics

The aqueous dispersions and other compositions were each applied to various plastic plates (2 mm thick;

no surface treatment) to a thickness (after drying) of about 10 μm, dried at 80° C. for 10 minutes and tested for adhesion. The results obtained are shown in Table 12. In the table, the upper row data for each dispersion or composition are adhesion data obtained in the original state, while the lower row data are adhesion data obtained after immersion in tap water at room temperature for 24 hours.

TABLE 12

| Aqueous dispersion etc. No. | PMMA plate | PC plate | ABS plate |
|---|---|---|---|
| Aqueous crosslinkable resin dispersion R-5 | 9 9 | 9 8 | 10 9 |
| Aqueous crosslinkable resin dispersion R-7 | 10 9 | 10 9 | 10 10 |
| Aqueous crosslinkable resin dispersion R-21 | 10 10 | 10 10 | 10 9 |
| Aqueous composition L-3 | 10 9 | 10 10 | 10 10 |
| Aqueous composition L-9 | 10 10 | 10 10 | 10 10 |
| Aqueous resin composition M-8 | 10 9 | 10 10 | 10 10 |
| Water-dispersible composition N-2 | 10 10 | 10 10 | 10 10 |
| Aqueous resin dispersion (for comparison) r-2 | 5 2 | 6 1 | 6 2 |
| Aqueous resin dispersion (for comparison) r-10 | 5 3 | 7 2 | 6 3 |

PMMA: polymethyl methacrylate
PC: polycarbonate

EXAMPLE 60

Binders for Nonwoven Fabrics

The aqueous dispersions and other compositions were tested as binders for a nonwoven-fabric interlining cloth in the following manner. The results are shown in Table 13.

Performance Testing of Nonwoven-Fabric Interlining Cloth

Treating Conditions

The aqueous dispersions and other compositions were each diluted with water to a nonvolatile matter content of 20%. A polyester nonwoven-fabric interlining cloth (weioghing 160 g/m²) was immersed in each dilution, then squeezed to 80% squeezing, and dried by heating at 100° C. for 5 minutes.

Washing Resistance

The feeling was measured by the 45° cantilever method according to JIS L-1085 "Methods of testing nowoven-fabric interlining cloths". The washing resistance was evaluated in terms of the percentage of feeling retention after 5 washings as calculated relative to the feeling before washing. The washing test, too, was performed according to JIS L-1085.

TABLE 13

| Aqueous dispersion etc. No. | Washability (%) |
|---|---|
| Aqueous crosslinkable resin dispersion R-3 | 86 |
| Aqueous crosslinkable resin dispersion R-8 | 80 |
| Aqueous crosslinkable resin dispersion R-10 | 88 |
| Aqueous composition L-3 | 90 |
| Aqueous resin composition M-2 | 82 |
| Water-dispersible composition N-1 | 84 |
| Aqueous resin dispersion (for comparison) r-3 | 42 |
| Aqueous resin dispersion (for comparison) r-9 | 53 |

EXAMPLE 61

Binders for Flocking

The aqueous crosslinkable resin dispersions were tested as binders for flocking in the following manner. The test results are shown in Table 14. Flocked fabric manufacturing conditions An alkali thickening type thickner and aqueous ammonia were added to each of the aqueous dispersions and other compositions to adjust the viscosity to 20,000-25,000 cps. A 9A spun rayon twill fabric was uniformly coated with each composition in a coating amount of 200 g/m² by means of a doctor knife and immediately flocked with 0.6-mm-long 1.5-denier rayon piles using an electrostatic flocking machine at a voltage of 30 kV and a pole-to-pole distance of 10 cm. The flocked fabric was then dried by heating at 90° C. for 10 minutes and, after cooling, the excess piles were removed.

Abrasion Resistance Testing

The test was performed by the JIS L-1084 45R method using a Gaku-Shin (Japan Society for the Promotion of Science) type color abrasion resistance tester. In testing for the abrasion resistance in the state wet with water and the abrasion resistance in the state wet with perclene, the test specimens were immersed in water or perclene for 15 minutes and then tested in the wet state. The abrasion resistance was evaluated in terms of the number of rubbings as required for the base fabric surface to be exposed as a result of falling of piles.

TABLE 14

| | Abrasion resistance (rubbings) | | |
|---|---|---|---|
| Aqueous crosslinkable resin dispersion No. | Original state | When wet with water | When wet with perclene |
| R-8 | >1,000 | 700 | 550 |
| R-9 | >1,000 | 800 | 700 |
| R-10 | >1,000 | >1,000 | 900 |
| r-3 (for comparison) | 450 | 100 | 50 |
| r-9 | 500 | 110 | 45 |

EXAMPLE 62

Carpet Back Coating Compositions

The aqueous crosslinkable resin dispersions were tested as carpet back coating compositions in the following manner. The results obtained are shown in Table 15.

Treating Conditions

To 100 parts of each aqueous crosslinkable resin dispersion were added 30 parts of heavy calcium carbonate and an appropriate amount each of an alkali thickening type thickener and aqueous ammonia to give, after uniformly mixing, a viscosity of about 30,000 cps. The thus-adjusted dispersion was uniformly applied to the back of a tufted carpet (polypropylene split yarn base cloth with nylon piles) in a coating amount of 1,000 g/m² and then dried by heating at 100° C. for 20 minutes by means of a hot air drier.

Pile Removing Strength

The pile removing strength of each carpet was measured according to JIS L-102 "Methods of testing carpets and the like". The pile removing strength after weathering was measured after allowing the test specimen to stand in a sun-shine type weather meter for 1,000 hours and then allowing it to stand at ordinary temperature for 24 hours.

TABLE 15

| Aqueous crosslinkable resin dispersion No. | Pile removing strength (kg/pile) | |
| --- | --- | --- |
| | Original state | Weather meter |
| R-8 | 3.1 | 3.0 |
| R-9 | 3.9 | 3.5 |
| R-10 | 4.2 | 4.9 |
| r-3 (for comparison) | 1.5 | 1.1 |
| r-9 (for comparison) | 2.3 | 1.3 |

EXAMPLE 63

Adhesives for Synthetic Leather-Like Sheet Materials

The aqueous crosslinkable resin dispersions were tested as adhesives for synthetic leather-like sheet materials. The results are shown in Table 16.

Treating Conditions

A solvent-type polyurethane resin was applied to a release paper to a thickness of 20 μm and then dried to give a skin layer. Separately, each aqueous crosslinkable resin dispersion was adjusted to a viscosity of about 20,000 cps by adding an alkali thickening type thickener and aqueous ammonia. The dispersion so adjusted was uniformly applied onto the above-mentioned skin layer in a coating amount of 150 g/m$^2$ by means of a doctor knife. The thus-coated skin layer was immediately brought into close contact with a cotton/polyester woven fabric, and the resulting assembly was dried by heating at 100° C. for 5 minutes. After cooling, the release paper was peeled off to give a synthetic leather-like sheet material.

Peeling Strength

The peeling strength was measured under the peeling test conditions described in JIS K-6772. The peeling strength after jungle test was measured after allowing the test specimen to stand in a constant-temperature, constant-humidity room maintained at 50° C. and at least 98% relative humidity for 30 days and then allowing it to stand at room temperature for 24 hours.

TABLE 16

| Aqueous crosslinkable resin dispersion No. | Peel strength (kg/3 cm) | |
| --- | --- | --- |
| | Original state | After jungle test |
| R-8 | 4.6 | 4.2 |
| R-9 | 5.5 | 5.0 |
| R-10 | 6.0 | 5.7 |
| r-3 (for comparison) | 1.6 | 1.2 |
| r-9 (for comparison) | 1.8 | 1.5 |

EXAMPLE 64

Binders for Glass Fibers

The aqueous dispersions and other compositions were each evaluated for their performance as internal binders for glass paper and as binders for bundling glass fiber chopped strands. The test methods used are described below and the results are shown in Table 17.

Test Methods (1) Binders for glass paper
 1) Preparation of glass paper
 Glass fibers, 4 μm in fiber diameter, were beaten by a conventional method and dispersed in water in a concentration of 1 g/liter. To the dispersion was added with stirring the aqueous dispersion or the like in an amount of 15% (on the nonvolatile matter basis) relative to the glass fiber weight. Then, Accofloc C470 (Mitsui-Cyanamid's macromolecular cationic flocculant) was added to cause flocculation of the system, and the flocculated mass was subjected to papermaking. The sheet obtained was dried at 150° C. for 5 minutes to give a glass paper sheet with a basis weight of about 100 g.

2) Tensile strength of glass paper
 The glass paper sheet was cut to 2.5-cm-wide strips and these were tested for tensile strength in the dry state and in the wet state after immersion in water at room temperature for 24 hours using an Instron universal tester.

(2) Binders for bundling
 1) Preparation of chopped strands
 The dispersion to be tested was diluted with water to a nonvolatile matter content of 5%. To 100 parts of this diluted dispersion were added 1.5 parts of a polyoxyethylenesorbitan fatty acid ester (Kao Chemical's Tween 80) as lubricant and 0.5 part of γ-aminopropyltriethoxysilane as coupling agent. The thus-obtained binder (bundling liquid) was applied to melt-spun E glass fibers on a rotating roll, and the binder-coated glass fibers were bundled together, then cut to a length of about 6 mm and dried to give chopped strands.

2) Collectivity of chopped strands
 The chopped strands obtained were evaluated by the eye for the extent of cracking. The symbols ⊚, ○, Δ and × used in the table mean that the occurrence of cracking was respectively as follows:
 ⊚: No occurrence.
 ○: A few cracks.
 Δ: A rather large number of cracks.
 ×: A very large number of cracks.

TABLE 17

| Aqueous dispersion etc. No. | Glass fiber paper tensile strength (kg/2.5 cm) | | Chopped strand convergency |
| --- | --- | --- | --- |
| | Dry strength | Wet strength | |
| Aqueous crosslinkable resin dispersion R-17 | 3.6 | 2.4 | ○ |
| Aqueous crosslinkable resin dispersion R-18 | 3.9 | 2.5 | ○ |
| Aqueous crosslinkable resin dispersion R-19 | 4.3 | 2.7 | ⊚ |
| Aqueous composition L-7 | 4.7 | 2.8 | ⊚ |
| Aqueous composition L-11 | 4.9 | 3.1 | ⊚ |
| Aqueous resin composition M-6 | 5.0 | 2.7 | ⊚-○ |
| Aqueous resin composition M-10 | 5.1 | 2.5 | ⊚ |
| Water-dispersible composition N-6 | 5.0 | 3.3 | ⊚ |
| Aqueous resin composition (for comparison) r-6 | 3.5 | 0.6 | Δ-× |
| Aqueous resin composition (for comparison) r-12 | 3.3 | 0.1 | × |

Note) In the processes of glass paper making and chopped strand production, foaming occurred only to a slight extent and handling was easy with the aqueous dispersions and other compositions according to the invention, whereas, with the aqueous resin dispersion r-1 for comparison, foaming was significant and handling was difficult.

EXAMPLE 65

Adhesives for Paper Labels

The aqueous crosslinkable resin dispersions and the aqueous resin dispersions for comparison were each applied to a release paper to a thickness (after drying) of 15-20 μm. After drying at 100° C. for 2 minutes, the adhesive layer was transferred from the release paper to a coat paper sheet by bringing the latter into close contact with the release paper, whereby a paper label to serve as a test specimen was prepared. The paper label test specimens obtained in that manner were tested for physical properties by the methods described below. As a result, it was found that the aqueous crosslinkable resin dispersions R-11 to R-13 are very excellent in initial physical characteristics, such as ball tack, adhesion and holding power, and that these physical characteristics do not decrease even after storage under high-temperature, high-humidity conditions, hence said dispersions give good moisture resistance. On the contrary, the aqueous resin dispersions r-4 and r-10 for comparison underwent marked decreases in such physical properties as ball tack, adhesion and holding power during storage under high-temperature, high-humidity conditions, hence were very poor in moisture resistance. More detailed results are shown in Table 18.

Test Methods

Tack: The tack was measured by the ball rolling method described in JIS Z-0237.

Adhesion: The 180° peeling adhesion as defined in JIS Z-0237 (adherends: stainless steel plates; g/25 mm) was measured. The adhesion with polyethylene plates as adherends was also measured by the same method.

Holding power: A load of 1 kg was applied to the 20 mm×20 mm adhesion area at 40° C. in accordance with the method prescribed in JIS Z-0237, and the holding time or the slippage distance after a certain period of time was measured.

TABLE 18

| Aqueous crosslinkable resin dispersion No. | Storage conditions* | Tack | Adhesion Stainless steel sheet | Adhesion Polyethylene sheet | Holding power |
|---|---|---|---|---|---|
| R-11 | Ordinary temperature | 13 | 2390 | 1150 | No slippage after 3 hours |
|  | High temperature high humidity | 12 | 2320 | 1080 | No slippage after 3 hours |
| R-12 | Ordinary temperature | 12 | 2010 | 970 | No slippage after 3 hours |
|  | High temperature high humidity | 11 | 1920 | 950 | No slippage after 3 hours |
| R-13 | Ordinary temperature | 13 | 2700 | 1210 | No slippage after 3 hours |
|  | High temperature high humidity | 13 | 2710 | 1200 | No slippage after 3 hours |
| r-4 (for comparison) | Ordinary temperature | 11 | 1520 | 820 | Falling after 2 minutes |
|  | High temperature high humidity | 3 | 190 | 50 | Falling after 30 minutes |
| r-10 (for comparison) | Ordinary temperature | 12 | 1930 | 920 | Falling after 30 minutes |
|  | High temperature high humidity | 7 | 1010 | 530 | Falling after 5 minutes |

* The storage was carried out as follows: The aqueous crosslinkable resin dispersion to be tested was applied to a release paper and dried. Onto the resulting layer, a coat paper sheet was placed in close contact with said layer. For testing at ordinary temperature, the assembly was allowed to stand at 23° C. and 65% RH for 1 day prior to testing and, for testing after exposure to high-temperature, high-humidity conditions, the assembly was allowed to stand at 50° C. and 95% RH for 10 days and then at 23° C. and 65% RH for 1 day.

EXAMPLE 66

The aqueous crosslinkable resin dispersions were each applied to an OPP (oriented polypropylene) film (1 cm×15 cm) to a dry film thickness of 15 μm and dried at 105° C. for 2 minutes to give an adhesive tape. This was applied to a stainless steel plate, the whole was immersed in tap water at 40° C. for 5 days and then evaluated for the extent of whitening or blushing. The results are shown in Table 19.

TABLE 19

| Aqueous crosslinkable resin dispersion No. | Extent of whitening |
|---|---|
| R-11 | No whitening |
| R-12 | Slight whitening in edge portions |
| R-13 | No whitening |
| r-4 (for comparison) | Intense whitening in edge portions and overall slight whitening |
| r-10 (for comparison) | Somewhat intense whitening in edge portions and overall slight whitening |

EXAMPLE 67

Binders for Heat-Sensitive Recording Paper

The aqueous dispersions and so forth were diluted with water to a concentration of 10% and the dilutions were used as binders in the following liquid compositions A, B and C:

| "Liquid composition A" | |
|---|---|
| 3-N-methyl-N-cyclohexylamino-6-methyl-7-anilinofluoran | 300 parts |
| 10% Dispersion | 300 parts |
| Water | 400 parts |
| "Liquid composition B" | |
| 4,4'-Isopropylidenebis(2,6-dibromophenol) | 300 parts |
| 10% Dispersion | 200 parts |
| Water | 400 parts |
| "Liquid composition C" | |
| di-o-chlorophenyl adipate | 100 parts |
| Calcium carbonate | 300 parts |
| 10% Dispersion | 200 parts |
| Water | 300 parts |

The above compositions were each made up into a dispersion by means of a sand grinder until the particle size reached 0.8±0.1 μm. Then, 20 parts of liquid composition A, 70 parts of liquid composition B and 10 parts of liquid composition C, each in the form of a dispersion, were blended and the thus-prepared coating liquid for forming a heat-sensitive color-developing layer was applied to a commercial fine paper basis weight of 55 g/m² to a dry coating weight of 6 g/m² by means of a wire bar and then dried to give a heat-sensitive recording paper.

The heat-sensitive recording papers obtained in the above manner were tested for sticking resistance and water resistance. The results obtained are shown in Table 20. The sticking resistance was evaluated using a Toshiba Medical model TP8300 printer for ultrasonography according to the following criteria:

5: No sticking sound.
4: Almost no sticking sound.
3: Soft sticking sound.
2: Big sticking sound; the coat film is not taken up by the head.
1: Big sticking sound; the coat film is taken up by the head.

For water resistance evaluation, water was dropped on the boundary between the color-developed portion (black) and undeveloped portion, the boundary portion was rubbed with a finger, and the extent of migration of the dye from the color-developed portion was investigated. The symbols ○, Δ and × used in the table respectively have the following meanings:

○: No dissolution from the color-developed portion.
Δ: Slight dissolution from the color-developed portion.
×: Much dissolution from the color-developed portion.

TABLE 20

| Aqueous dispersion etc. No. | Sticking resistance | Water resistance |
|---|---|---|
| Aqueous crosslinkable resin dispersion R-14 | 3 | Δ |
| Aqueous crosslinkable resin dispersion R-16 | 4 | ○-Δ |
| Aqueous crosslinkable resin dispersion R-22 | 5 | ○-Δ |
| Aqueous composition L-5 | 4 | ○-Δ |
| Aqueous resin composition M-4 | 4 | ○-Δ |
| Aqueous resin composition M-5 | 4 | ○-Δ |
| Aqueous resin composition M-9 | 4 | ○ |
| Water-dispersion composition N-4 | 5 | ○ |
| Water-dispersion composition N-5 | 5 | ○ |
| Aqueous resin dispersion (for comparison) r-5 | 1 | × |
| Aqueous resin dispersion (for comparison) r-11 | 1 | Δ-× |

What is claimed is:

1. An aqueous crosslinkable resin dispersion characterized by its being obtained by emulsion-polymerizing in an aqueous medium a monomer composition I composed of 0.1-40% by weight of at least one polymerizable monomer (a) having, within its molecular structure, a polymerizable double bond and an epoxy, aziridine or oxazoline group and 60-99.9% by weight of one or more other polymerizable monomers (b) copolymerizable with the polymerizable monomer (a), the sum total of the polymerizable monomers (a) and (b) being 100% by weight, in the presence of a water-soluble or water-dispersible emulsifier or emulsifiers selected from either one or both of the groups (P) and (Q) below:

(P) polymers IIa having a terminal alkylthio group and an acid value of not less than 200 obtained by polymerizing a polymerizable monomer composition A containing an unsaturated carboxylic acid as an essential component thereof, in the presence of an alkylmercaptan B having 6-18 carbon atoms, or salts thereof;

(Q) polymers IIb having a terminal alkylthio group and an acid value of not less than 200 obtained by polymerizing a polymerizable monomer composition A containing an unsaturated carboxylic acid as an essential component thereof, in the presence of an alkylmercaptan B having 6-18 carbon atoms, and further reacting the resulting polymer with at least one polymerizable monomer (c) having, within its molecular structure, a group reactive with a carboxyl group, or salts thereof.

2. An aqueous crosslinkable resin dispersion as claimed in claim 1, wherein the emulsifier or emulsifiers have a $R_1S-$ group, wherein $R_1$ is a $C_{6-18}$ alkyl group, at one end of the molecular structure and a $-H$ at the other end of the molecular structure and wherein the emulsifier or emulsifiers comprise repeating units of the formulas

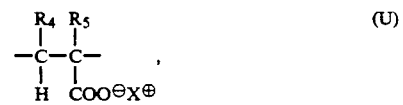

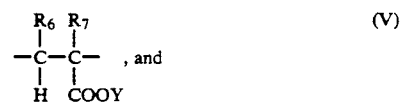

wherein $R_2$-$R_8$ are, independently in each repeating unit, hydrogen, halogen, methyl, carboxyl, alkoxycarbonyl or $COO^-M^+$, wherein $M^+$ is an ammonium cation, an amine cation, an alkali metal cation or $\frac{1}{2}M1^+$, where $M1^+$ is an alkaline earth metal cation, $X^+$ is, independently in each repeating unit, an ammonium cation, an amine cation, an alkali metal cation or $\frac{1}{2}M1^+$, where $M1^+$ is an alkaline earth metal cation, Y is a group having a polymerizable unsaturated bond, Z is cyano, phenyl, substituted phenyl, amido, N-mono- or N,N-disubstituted amido, alkoxycarbonyl or a group of the formula $-COO-(R_9-O-)_nH$, where $R_9$ is $C_{2-4}$ alkylene and n is an integer of 1-50, said repeating units T, U, V and W being arranged in an optional order provided that the following numerical conditions are satisfied:

the number of occurrences of T and the number of occurrences of U are each, independently, 0 or 1-500, with the total number of T and U occurrences being 1-500, the number of occurrences of V is 0 or 1–100 and the number of occurrences of W is 0 or 1–250.

3. An aqueous crosslinkable resin dispersion as claimed in claim 2, wherein the emulsifier or emulsifiers used have $R_1S-$ at one end of their molecule and $-H$ at the other and comprises repeating units of the formulas

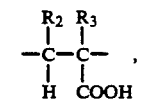 (T)

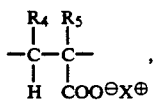 (U)

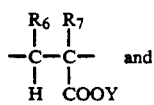 (V)

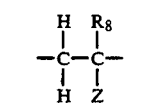 (W)

in which $R_1$ to $R_8$, X, Y and Z are as defined above, said repeating units T, U, V and W being arranged in an optional order provided that the following numerical conditions are satisfied: that the number of occurrences of T and the number of occurrences of U are each 1 to 499, with a total number of occurrences of T and U of 2 to 500, that the number of occurrences of V is 0 or 1 to 100 and that the number of occurrences of W is 0 or 1 to 250.

4. An aqueous crosslinkable resin dispersion as claimed in claim 1, wherein the other polymerizable monomers (b) comprise at least one organosilane monomer having, within its molecule, a polymerizable unsaturated group and at least one hydrolyzable group directly bound to the silicon atom.

5. An aqueous, crosslinkable resin dispersion as claimed in claim 1, wherein a polymer selected from the group (Q) is used as the emulsifier.

6. An aqueous crosslinkable resin dispersion as claimed in claim 1, wherein the emulsifier or emulsifiers are used in an amount of 0.5 to 20 parts by weight per 100 parts by weight of the monomer composition [I].

7. An aqueous crosslinkable resin dispersion as claimed in claim 1, wherein the polymerizable monomer or monomers (a) are used in an amount of 0.5 to 20% by weight.

8. A method of producing aqueous crosslinkable resin dispersions which comprises emulsion-polymerizing in an aqueous medium a monomer composition I composed of 0.1–40% by weight of at least one polymerizable monomer (a) having, within its molecule, a polymerizable double bond and an epoxy, aziridine or oxazoline group and 60–99.9% by weight of one or more other polymerizable monomers (b) copolymerizable with the polymerizable monomer (a), the sum total of the polymerizable monomers (a) and (b) being 100% by weight, in the presence of a water-soluble or water-dispersible emulsifier or emulsifiers selected from either one or both of the groups (P) and (Q) mentioned below:

(P) Polymers IIa having a terminal alkylthio group and an acid value of not less than 200 obtained by polymerizing a polymerizable monomer composition A containing an unsaturated carboxylic acid as an essential component thereof in the presence of an alkylmercaptan B having 6 to 18 carbon atoms, or salts thereof;

(Q) Polymers IIb having a terminal alkylthio group and an acid value of not less 200 obtained by polymerizing a polymerizable monomer composition A containing an unsaturated carboxylic acid as an essential component thereof in the presence of an alkylmercaptan B having 6 to 18 carbon atoms and further reacting the resulting polymer with at least one polymerizable monomer (c) having, within its molecule, a group reactive with a carboxyl group, or salts thereof.

9. A method of producing aqueous crosslinkable resin dispersions as claimed in claim 8, wherein the emulsifier or emulsifiers used have $R_1S-$ at one end of their molecule and $-H$ at the other and comprises repeating units of the formulas

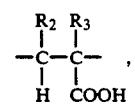 (T)

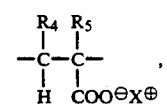 (U)

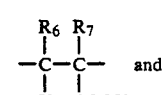 (V)

 (W)

in which $R_1$ to $R_8$ are, independently in each repeating unit, hydrogen, halogen, methyl, carboxyl, alkoxycarbonyl or $COO^-M^+$, wherein $M^+$ is an ammonium cation, an amine cation, an alkali metal cation or $\frac{1}{2}M1^+$, where $M1^+$ is an alkaline earth metal cation, $X^+$ is, independently in each repeating unit, an ammonium cation, an amine cation, an alkali metal cation or $\frac{1}{2}M1^+$, where $M1^+$ is an alkaline earth metal cation, Y is a group having a polymerizable unsaturated bond, Z is cyano, phenyl, substituted phenyl, amido, N-mono- or N,N-disubstituted amido, alkoxycarbonyl or a group of the formula $-COO-(R_9-O-)_nH$, where $R_9$ is $C_{2-4}$ alkylene and n is an integer of 1–50, said repeating units T, U, V and W being arranged in an optional order provided that the following numerical conditions are satisfied: that the number of occurrences of T and the number of occurrences of U are each independently 0 or 1 to 500, with a total number of occurrences of T and U of 1 to 500, that the number of occurrences of V is 0 or 1 to 100 and that the number of occurrences of W is 0 or 1 to 250.

10. A method of producing aqueous crosslinkable resin dispersions as claimed in claim 8, wherein the emulsifier or emulsifiers used have $R_1S-$ at one end of their molecule and $-H$ at the other and comprises repeating units of the formulas

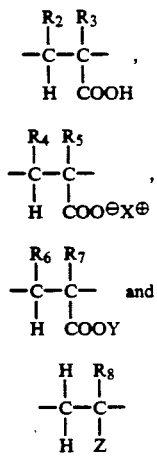

in which $R_1$ to $R_8$ are, independently in each repeating unit, hydrogen, halogen, methyl, carboxyl, alkoxycarbonyl or $COO^-M^+$, wherein $M^+$ is an ammonium cation, an amine cation, an alkali metal cation or $\frac{1}{2}M1^+$, where $M1^+$ is an alkaline earth metal cation, $X^+$ is, independently in each repeating unit, an ammonium cation, an amine cation, an alkali metal cation or $\frac{1}{2}M1^+$, where $M1^+$ is an alkaline earth metal cation, Y is a group having a polymerizable unsaturated bond, Z is cyano, phenyl, substituted phenyl, amido, N-mono- or N,N-disubstituted amido, alkoxycarbonyl or a group of the formula $-COO-(R_9-O-)_nH$, where $R_9$ is $C_{2-4}$ alkylene and n is an integer of 1-50, said repeating units T, U, V and W being arranged in an optional order provided that the following numerical conditions are satisfied: that the number of occurrences of t and the number of occurrences of U are each 1 to 499, with a total number of occurrences of T and U of 2 to 500, that the number of occurrences of V is 0 or 1 to 100 and that the number of occurrences of W is 0 or 1 to 250.

11. A method of producing aqueous crosslinkable resin dispersions as claimed in claim 8, wherein the monomer composition I is divided into two or more portions differing in composition from one another and these portions are fed in sequence, so that the polymerization is carried out in the manner of multistep polymerization.

12. A method of producing aqueous crosslinkable resin dispersions as claimed in claim 1, wherein at least two of the divided portions differ in the content of polymerizable monomer or monomers (a) from each other.

13. A method of producing aqueous crosslinkable resin dispersions as claimed in claim 11, wherein at least one of the divided portions does not contain any polymerizable monomers (a).

14. A method of producing aqueous crosslinkable resin dispersions as claimed in claim 13, wherein the divided portion which does not contain any polymerizable monomers (a) is subjected to polymerization in the last step.

15. An aqueous composition which comprises 100 parts by weight (on the solids basis) of an aqueous crosslinkable resin dispersion as claimed in claim 1 and 1 to 200 parts by weight of a metal oxide or metal hydroxide or mixture thereof in the form of fine particles.

16. An aqueous composition which comprises 100 parts by weight (on the solids basis) of an aqueous crosslinkable resin dispersion as claimed in claim 4 and 1 to 200 parts by weight of a metal oxide or metal hydroxide or mixture thereof in the form of fine particles.

17. An aqueous composition as claimed in claim 16, wherein the metal oxide or metal hydroxide or mixture thereof in the form of fine particles is aqueous colloidal silica.

18. An aqueous resin composition which comprises 100 parts by weight (on the solids basis) of an aqueous crosslinkable resin dispersion as claimed in claim 1 and 0.001 to 100 parts by weight of a water-soluble resin.

19. An aqueous resin composition as claimed in claim 18, wherein the water-soluble resin is polyvinyl alcohol.

20. An aqueous resin composition as claimed in claim 19, wherein the aqueous resin dispersion is obtained by emulsion polymerization in the presence of polyvinyl alcohol.

21. An aqueous resin composition as claimed in claim 19 as obtained by reacting the aqueous crosslinkable resin dispersion and polyvinyl alcohol in the presence of a radical polymerization catalyst.

22. A water-dispersible composition which comprises 100 parts by weight (on the solids basis) of an aqueous crosslinkable resin dispersion as claimed in claim 1, 1–200 parts by weight, of a metal oxide or metal hydroxide or mixture thereof in the form of fine particles and 0.001 to 100 parts by weight of a water-soluble resin.

23. A coating composition which contains an aqueous crosslinkable resin dispersion as claimed in claim 1.

24. A coating composition as claimed in claim 23, which further contains a metal oxide or metal hydroxide or mixture thereof in the form of fine particles.

25. A coating composition as claimed in claim 24, wherein the metal oxide or metal hydroxide or mixture thereof in the form of fine particles is aqueous colloidal silica.

26. A coating composition as claimed in claim 25, which further contains a water-soluble resin.

27. A coating composition as claimed in claim 26, wherein the water-soluble resin is polyvinyl alcohol.

28. A coating composition as claimed in claim 26, which further contains a metal oxide or metal hydroxide or mixture in the form of fine particles.

29. A coating composition which comprises an aqueous crosslinkable resin dispersion as claimed in claim 4.

30. A coating composition as claimed in claim 29, which further contains a crosslinking agent.

31. A coating composition as claimed in claim 30, which further contains a filler.

32. An adhesive which contains an aqueous crosslinkable resin dispersion as claimed in claim 1.

33. An adhesive as claimed in claim 32, which further contains a metal oxide or metal hydroxide or mixture thereof in the form of fine particles.

34. An adhesive as claimed in claim 33, wherein the metal oxide and/or metal hydroxide in the form of fine particles is aqueous colloidal silica.

35. An adhesive as claimed in claim 34, which further contains a water-soluble resin.

36. An adhesive as claimed in claim 35, wherein the water-soluble resin is polyvinyl alcohol.

37. An adhesive as claimed in claim 35, which further contains a metal oxide or metal hydroxide or mixture thereof in the form of fine particles.

38. An adhesive as claimed in any one of claims 32–37, wherein the polymer obtained by polymerizing the monomer composition I has a glass transition temperature within the range of −80° C. to 0° C.

39. A coating composition for heat-sensitive color-developing layer formation which contains an aqueous crosslinkable resion dispersion as claimed in claim 1 together with heat-sensitive color-developing components.

40. A coating composition for heat-sensitive color-developing layer formation as claimed in claim 39, which further contains a metal oxide or metal hydroxide or mixture thereof in the form of fine particles.

41. A coating composition for heat-sensitive color-developing layer formation as claimed in claim 40, wherein the metal oxide or metal hydroxide or mixture thereof in the form of fine particles is aqueous colloidal silica.

42. coating composition for heat-sensitive color-developing layer formation as claimed in claim 41, which further contains a water-soluble resin.

43. A coating composition for heat-sensitive color-developing layer formation as claimed in claim 42, wherein the water-soluble resin is polyvinyl alcohol.

44. A coating composition for heat-sensitive color-developing layer formation as claimed in claim 42 or 43, which further contains a metal oxide or metal hydroxide or mixture thereof in the form of fine particles.

45. A coating composition for pressure-sensitive color-developing layer formation which contains an aqueous crosslinkable resin dispersion as claimed in claim 1 together with pressure-sensitive color-developing components.

* * * * *